(12) United States Patent
Willison et al.

(10) Patent No.: US 11,440,456 B1
(45) Date of Patent: Sep. 13, 2022

(54) LAND VEHICLES ADAPTED FOR USE AS ELECTRIC DELIVERY VEHICLES

(71) Applicant: Workhorse Group Inc., Loveland, OH (US)

(72) Inventors: Robert Willison, Lebanon, OH (US); Donald L. Wires, Loveland, OH (US); Gary Cain, Loveland, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

(21) Appl. No.: 17/546,555

(22) Filed: Dec. 9, 2021

(51) Int. Cl.
| | |
|---|---|
| *B60P 3/00* | (2006.01) |
| *B60R 7/04* | (2006.01) |
| *B62D 33/06* | (2006.01) |
| *B60R 1/00* | (2022.01) |
| *B60J 1/10* | (2006.01) |
| *B60R 11/04* | (2006.01) |

(Continued)

(52) U.S. Cl.
CPC ............. *B60P 3/007* (2013.01); *B60J 1/10* (2013.01); *B60K 1/02* (2013.01); *B60K 7/0007* (2013.01); *B60K 37/06* (2013.01); *B60N 2/005* (2013.01); *B60Q 1/32* (2013.01); *B60R 1/006* (2013.01); *B60R 3/00* (2013.01); *B60R 7/04* (2013.01); *B60R 9/055* (2013.01); *B60R 11/04* (2013.01); *B60R 25/01* (2013.01); *B60R 25/25* (2013.01); *B60T 1/06* (2013.01); *B62D 1/04* (2013.01); *B62D 21/15* (2013.01); *B62D 25/07* (2013.01); *B62D 33/06* (2013.01); *B60K 2007/0092* (2013.01)

(58) Field of Classification Search
CPC ... B60P 1/16; B60P 3/007; B60K 6/52; B60K 1/02; B60K 7/0007; B62D 21/04; B62D 1/04
See application file for complete search history.

(56) References Cited

U.S. PATENT DOCUMENTS

| | | |
|---|---|---|
| 1,251,749 A | 1/1918 | Cilley |
| 1,728,889 A | 9/1929 | Kemble |

(Continued)

FOREIGN PATENT DOCUMENTS

| | | |
|---|---|---|
| CN | 103359174 A | 10/2013 |
| CN | 110884568 A | 3/2020 |

(Continued)

OTHER PUBLICATIONS

International Search Report; International Searching Authority; International Patent Application No. PCT/US2021/012327; dated Mar. 9, 2021; 2 pages.

(Continued)

*Primary Examiner* — Hau V Phan
(74) *Attorney, Agent, or Firm* — Taft Stettinius & Hollister LLP

(57) ABSTRACT

Land vehicles are disclosed. A land vehicle includes a frame structure, a plurality of wheels supported by the frame structure, and a body supported by the frame structure. The frame structure includes an operator cage that at least partially defines an operator cabin and a rear compartment positioned rearward of the operator cage in a longitudinal direction. The body includes a first sidewall arranged on one side of the vehicle and a second sidewall arranged on another side of the vehicle opposite the first sidewall.

27 Claims, 22 Drawing Sheets

(51) Int. Cl.

| | |
|---|---|
| *B60K 7/00* | (2006.01) |
| *B60K 1/02* | (2006.01) |
| *B60T 1/06* | (2006.01) |
| *B60R 25/25* | (2013.01) |
| *B60R 25/01* | (2013.01) |
| *B62D 25/07* | (2006.01) |
| *B60Q 1/32* | (2006.01) |
| *B60R 9/055* | (2006.01) |
| *B60K 37/06* | (2006.01) |
| *B60R 3/00* | (2006.01) |
| *B60N 2/005* | (2006.01) |
| *B62D 1/04* | (2006.01) |
| *B62D 21/15* | (2006.01) |

(56) References Cited

U.S. PATENT DOCUMENTS

| | | | |
|---|---|---|---|
| 2,973,220 A | 2/1961 | White | |
| 3,066,621 A * | 12/1962 | Dean | B61D 17/043 |
| | | | 296/203.03 |
| 4,270,622 A | 6/1981 | Travis | |
| 4,676,545 A | 6/1987 | Bonfilio et al. | |
| 4,934,733 A | 6/1990 | Smith et al. | |
| 5,363,939 A | 11/1994 | Catlin | |
| 5,363,969 A * | 11/1994 | Shen | A45D 40/18 |
| | | | 206/45.24 |
| 5,690,378 A | 11/1997 | Romesburg | |
| 5,829,542 A | 11/1998 | Lutz | |
| 6,893,046 B2 | 5/2005 | Ledesma et al. | |
| 6,926,351 B2 | 8/2005 | Telehowski et al. | |
| 6,954,152 B1 * | 10/2005 | Matthews | B60R 1/00 |
| | | | 348/148 |
| 7,651,153 B2 | 1/2010 | Martin et al. | |
| 8,641,133 B1 | 2/2014 | Scaringe et al. | |
| 8,714,592 B1 * | 5/2014 | Thoreson | B60D 1/488 |
| | | | 280/769 |
| 9,103,535 B1 | 8/2015 | Strobel et al. | |
| 10,801,169 B2 * | 10/2020 | Roy | B60R 21/00 |
| 10,967,904 B2 * | 4/2021 | Penz | B62D 21/04 |
| 2006/0158024 A1 | 7/2006 | Wendi | |
| 2006/0273571 A1 * | 12/2006 | Matsumoto | B60K 15/04 |
| | | | 280/834 |
| 2007/0257570 A1 | 11/2007 | Walter et al. | |
| 2008/0003321 A1 * | 1/2008 | Kerr | B29C 33/306 |
| | | | 425/351 |
| 2009/0032321 A1 * | 2/2009 | Marsh | B60K 6/52 |
| | | | 903/906 |
| 2010/0025132 A1 | 2/2010 | Hill et al. | |
| 2010/0101900 A1 | 4/2010 | Usui | |
| 2010/0108417 A1 | 5/2010 | Gilmore | |
| 2010/0263954 A1 * | 10/2010 | Constans | B60G 7/02 |
| | | | 180/89.12 |
| 2011/0017527 A1 | 1/2011 | Oriel et al. | |
| 2013/0341971 A1 | 12/2013 | Masini et al. | |
| 2014/0054916 A1 * | 2/2014 | Knudtson | B62D 65/02 |
| | | | 296/24.3 |
| 2014/0083606 A1 | 3/2014 | Masini et al. | |
| 2014/0159468 A1 | 6/2014 | Heinen et al. | |
| 2014/0182954 A1 | 7/2014 | Weber | |
| 2015/0027795 A1 | 1/2015 | Hirai et al. | |
| 2015/0291017 A1 | 10/2015 | LaBiche | |
| 2016/0106073 A1 * | 4/2016 | Van Der Linde | A01K 45/005 |
| | | | 119/400 |
| 2017/0050514 A1 | 2/2017 | Li | |
| 2017/0113716 A1 | 4/2017 | Gong et al. | |
| 2017/0225715 A1 | 8/2017 | Kobayashi et al. | |
| 2017/0305253 A1 | 10/2017 | Perlo et al. | |
| 2018/0037151 A1 | 2/2018 | Bauer et al. | |
| 2018/0108891 A1 | 4/2018 | Fees et al. | |
| 2018/0290627 A1 * | 10/2018 | Hariri | B60R 25/245 |
| 2018/0337377 A1 | 11/2018 | Stephens et al. | |
| 2018/0345777 A1 | 12/2018 | Bimschein et al. | |
| 2019/0168678 A1 | 6/2019 | Magnuson et al. | |
| 2019/0217764 A1 * | 7/2019 | Conny | B60P 1/16 |
| 2019/0389444 A1 | 12/2019 | Kistner et al. | |
| 2020/0062183 A1 * | 2/2020 | Smith | B60R 3/02 |
| 2020/0369334 A1 | 11/2020 | Lee | |
| 2021/0171120 A1 | 6/2021 | Kim et al. | |

FOREIGN PATENT DOCUMENTS

| | | |
|---|---|---|
| DE | 102019109465 A1 | 10/2020 |
| EP | 1538072 A1 | 6/2005 |
| EP | 2552763 A2 | 2/2013 |
| EP | 3174680 A2 | 6/2017 |
| EP | 3689717 A1 | 8/2020 |
| FR | 2698601 A1 | 6/1994 |
| WO | 2016016662 A2 | 2/2016 |

OTHER PUBLICATIONS

Written Opinion of the International Searching Authority; International Searching Authority; International Patent Application No. PCT/US2021/012327; dated Mar. 9, 2021; 8 pages.

International Search Report; International Searching Authority; International Patent Application No. PCT/US2021/012330; dated Mar. 9, 2021; 2 pages.

Written Opinion of the International Searching Authority; International Searching Authority; International Patent Application No. PCT/US2021/012330; dated Mar. 9, 2021; 9 pages.

International Search Report; International Searching Authority; International Patent Application No. PCT/US2021/012332; dated Mar. 24, 2021; 2 pages.

Written Opinion of the International Searching Authority; International Searching Authority; International Patent Application No. PCT/US2021/012332; dated Mar. 24, 2021; 7 pages.

Supplementary European Search Report; European Patent Office; European Application No. 21710384.5; dated Oct. 21, 2021; 12 pages.

International Search Report; International Searching Authority; International Patent Application No. PCT/US2022/014847; dated Mar. 8, 2022; 3 pages.

Written Opinion of the International Searching Authority; International Searching Authority; International Patent Application No. PCT/US2022/014847; dated Mar. 8, 2022; 6 pages.

International Search Report; International Searching Authority; International Patent Application No. PCT/US2022/014844; dated Mar. 16, 2022; 2 pages.

Written Opinion of the International Searching Authority; International Searching Authority; International Patent Application No. PCT/US2022/014844; dated Mar. 16, 2022; 7 pages.

International Search Report; International Searching Authority; International Patent Application No. PCT/US2022/014852; dated Apr. 18, 2022; 2 pages.

Written Opinion of the International Searching Authority; International Searching Authority; International Patent Application No. PCT/US2022/014852; dated Apr. 18, 2022; 7 pages.

International Search Report; International Searching Authority; International Patent Application No. PCT/US2022/014851; dated Apr. 25, 2022; 2 pages.

Written Opinion of the International Searching Authority; International Searching Authority; International Patent Application No. PCT/US2022/014851; dated Apr. 25, 2022; 7 pages.

* cited by examiner

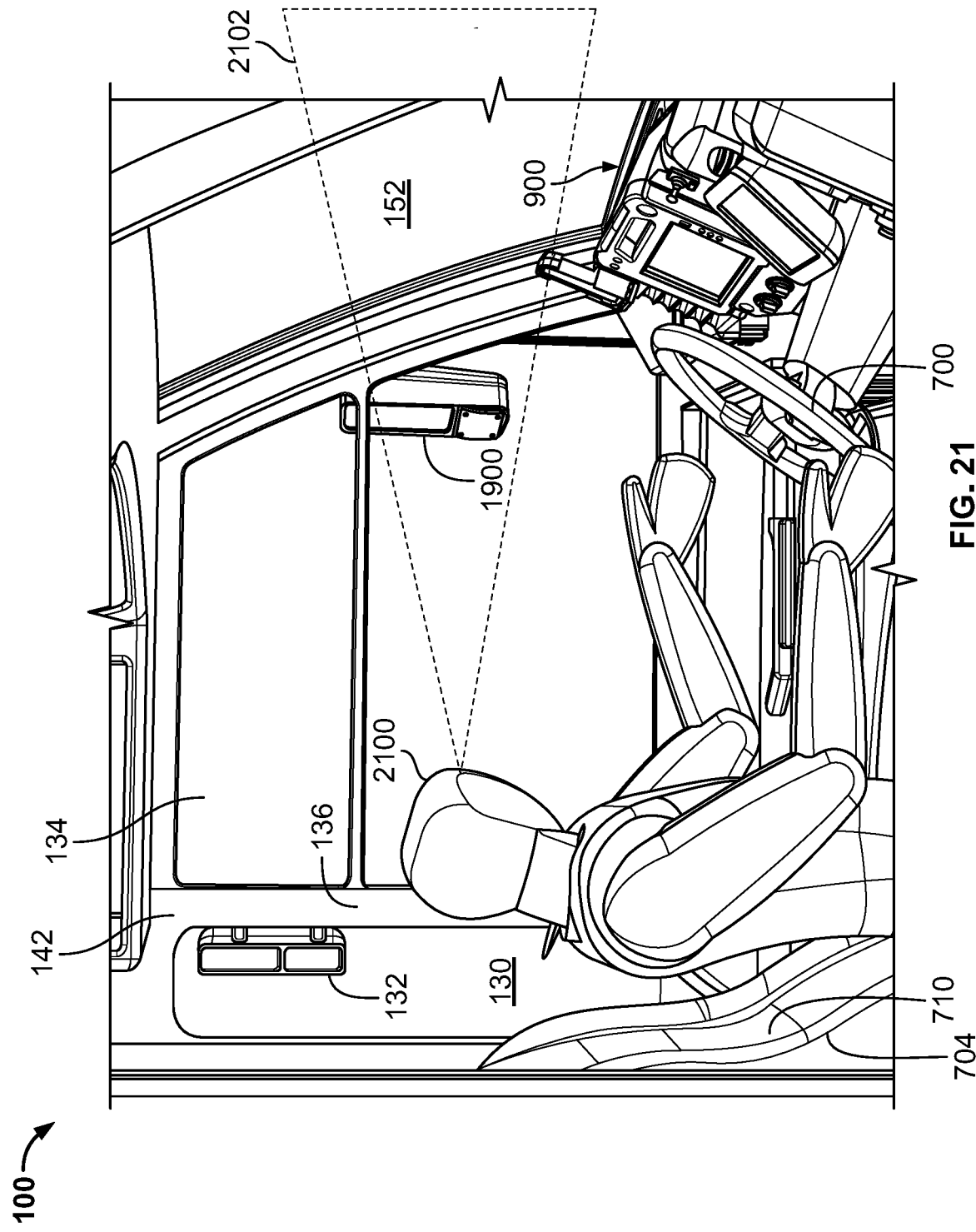

LAND VEHICLES ADAPTED FOR USE AS ELECTRIC DELIVERY VEHICLES

TECHNICAL FIELD

The present disclosure generally relates to land vehicles adapted for use in delivery applications, and, more particularly, to electric utility and delivery vehicles.

BACKGROUND

Land vehicles adapted for use in delivery applications may have various shortcomings. In particular, electrically-powered utility and delivery vehicles may have certain drawbacks. For those reasons, among others, electrically-powered land vehicles suited for use in delivery applications that avoid the limitations of conventional components and/or systems remain an area of interest.

SUMMARY

The present disclosure may comprise one or more of the following features and combinations thereof.

According to one aspect of the present disclosure, a land vehicle may include a frame structure, a plurality of wheels, and a body. The frame structure may include an operator cage that at least partially defines an operator cabin and a rear compartment positioned rearward of the operator cage in a longitudinal direction. The plurality of wheels and the body may be supported by the frame structure. The body may include a first sidewall arranged on one side of the vehicle and second sidewall arranged on another side of the vehicle opposite the first sidewall. The first sidewall may include a first door to provide access to the operator cabin from the one side of the vehicle. The second sidewall may include a second door to provide access to the operator cabin from the another side of the vehicle that is aligned with the first door in the longitudinal direction. The second sidewall may include an opera window located rearward of the second door in the longitudinal direction to permit visualization of an opera window viewing area located outside of the vehicle proximate the another side thereof by an operator positioned in the operator cabin adjacent the one side of the vehicle in use of the vehicle.

In some embodiments, the operator cabin may include a steering wheel, an operator seat, and a rack arranged in the operator cabin opposite the steering wheel and the operator seat that includes a plurality of trays. The operator cabin may include a pair of tracks affixed to a floor of the operator cabin and spaced apart from one another in the longitudinal direction, and the rack may be movable along the pair of tracks in a lateral direction perpendicular to the longitudinal direction between a stowed position, in which the rack is disposed distant from the operator seat, and a delivery position, in which the rack is disposed close to the operator seat. The land vehicle may have a gross vehicular weight rating (GVWR) of between 10,001 pounds and 14,000 pounds.

In some embodiments, the land vehicle may include an opera window mirror mounted to the second sidewall in close proximity to the opera window to permit visualization of an opera window mirror viewing area located outside of the vehicle proximate the another side thereof by an operator positioned in the operator cabin adjacent the one side of the vehicle in use of the vehicle, and the opera window mirror viewing area may extend at least partially rearward of the opera window viewing area in the longitudinal direction.

The land vehicle may include a side mirror mounted between the second door and a front windshield of the vehicle to permit visualization of a side mirror viewing area located outside of the vehicle proximate the another side thereof by an operator positioned in the operator cabin adjacent the one side of the vehicle in use of the vehicle, and the side mirror viewing area may extend at least partially rearward of the opera window mirror viewing area in the longitudinal direction. The land vehicle may include a camera system affixed to the side mirror.

In some embodiments, the land vehicle may include a plurality of electric motors to generate rotational power that are supported by the plurality of wheels, and one of the plurality of electric motors may be integrated directly into each one of the plurality of wheels. Additionally, in some embodiments, the land vehicle may include a brake system coupled to each one of the plurality of wheels, and each brake system may include a disc having a plurality of notches defined between circumferentially adjacent teeth of the disc, a first braking device configured to contact an outer face of the disc to resist rotation of one of the plurality of wheels, a second braking device circumferentially spaced from the first braking device about the disc that is configured to contact the outer face of the disc to resist rotation of the one of the plurality of wheels, and a third braking device configured to contact one or more teeth of the disc to resist rotation of the one of the plurality of wheels.

In some embodiments, the land vehicle may include an impact management system supported by the frame structure and positioned forward of the operator cage in the longitudinal direction, the frame structure may include a pair of rails that each extends in the longitudinal direction from a first end arranged adjacent a pair of front wheels of the vehicle to a second end arranged adjacent a pair of rear wheels of the vehicle, the impact management system may be configured to deform in response to impact forces applied thereto in use of the land vehicle to maintain structural integrity of the operator cage and the pair of rails, and the impact management system may include a crash cage extending in the longitudinal direction from the first ends of the pair of rails to a forward-most point of the land vehicle. Additionally, in some embodiments, the land vehicle may include (i) a first door handle mounted to the first door that includes a first lock and a first fingerprint identification feature configured to receive a fingerprint provided by an operator and (ii) a second door handle mounted to the second door that includes a second lock and a second fingerprint identification feature configured to receive a fingerprint provided by an operator, operation of the first lock may be controlled based on the fingerprint received by the first fingerprint identification feature, and operation of the second lock may be controlled based on the fingerprint received by the second fingerprint identification feature.

According to another aspect of the present disclosure, a land vehicle may include a frame structure, a plurality of wheels, a body, and a cap roof. The frame structure may include an operator cage that at least partially defines an operator cabin and a rear compartment positioned rearward of the operator cage in a longitudinal direction. The plurality of wheels and the body may be supported by the frame structure. The body may include a first sidewall arranged on one side of the vehicle having a first door to provide access to the operator cabin from the one side of the vehicle and a second sidewall arranged on another side of the vehicle opposite the first sidewall. The cap roof may be coupled to each of the first and second sidewalls and cover the operator cage and the rear compartment. A gutter may extend in the longitudinal direction above the first door to define an overhang above the first door. The gutter may be integrally formed with the cap roof.

In some embodiments, the land vehicle may include a gutter light arranged in close proximity to the gutter to illuminate an area located outside of the vehicle adjacent the first door in use of the vehicle. Additionally, in some embodiments, the cap roof may have a single-piece construction.

In some embodiments, the land vehicle may include a canopy coupled to the cap roof that includes a first canopy section and a second canopy section spaced from the first canopy section in the longitudinal direction, and one of the first canopy section and the second canopy section may be movable relative to the cap roof and the other of the first canopy section and the second canopy section in the longitudinal direction between an open position, in which access to a storage recess is permitted, and a closed position, in which access to the storage recess is restricted. The canopy may be at least partially movable relative to the cap roof to selectively permit overhead airborne delivery of one or more items into the storage recess.

According to yet another aspect of the present disclosure, a land vehicle may include a frame structure, a plurality of wheels, a body, and a cap roof. The frame structure may include an operator cage that at least partially defines an operator cabin and a rear compartment positioned rearward of the operator cage in a longitudinal direction. The plurality of wheels and the body may be supported by the frame structure. The body may include a first sidewall arranged on one side of the vehicle and a second sidewall arranged on another side of the vehicle opposite the first sidewall. The cap roof may be coupled to each of the first and second sidewalls and cover the operator cage and the rear compartment. The first sidewall may include a first door to provide access to the operator cabin from the one side of the vehicle. The second sidewall may include a second door to provide access to the operator cabin from the another side of the vehicle that is aligned with the first door in the longitudinal direction. The second sidewall may include an opera window located rearward of the second door in the longitudinal direction to permit visualization of an opera window viewing area located outside of the vehicle proximate the another side thereof by an operator positioned in the operator cabin adjacent the one side of the vehicle in use of the vehicle. A gutter may extend in the longitudinal direction above the first door to define an overhang above the first door. The gutter may be integrally formed with the cap roof.

In some embodiments, the operator cabin may include a control panel having a plurality of modular units each configured for individual removal and/or replacement without requiring removal and/or replacement of any of the other modular units. The land vehicle may have a gross vehicular weight rating (GVWR) of between 10,001 pounds and 14,000 pounds.

In some embodiments, the operator cabin may include a floor that is arranged a first distance in a vertical direction above a support surface on which the land vehicle is positioned. The land vehicle may include a step arranged on the one side of the vehicle to facilitate entry into, and exit from, the operator cabin from the one side of the vehicle, the step may be positioned in the vertical direction between the floor and the support surface, and the step may be arranged a second distance in the vertical direction above the support surface which is less than the first distance. In some embodiments, only one step may be provided to facilitate entry into, and exit from, the operator cabin from the one side of the vehicle.

According to yet another aspect of the present disclosure still, a land vehicle may include a frame structure, a plurality of wheels, and a body. The frame structure may include an operator cage that at least partially defines an operator cabin and a rear compartment positioned rearward of the operator cage in a longitudinal direction. The plurality of wheels and the body may be supported by the frame structure. The body may include a first sidewall arranged on one side of the vehicle and a second sidewall arranged on another side of the vehicle opposite the first sidewall. The first sidewall may include a first door to provide access to the operator cabin from the one side of the vehicle. The second sidewall may include a second door to provide access to the operator cabin from the another side of the vehicle that is aligned with the first door in the longitudinal direction. The second sidewall may include an opera window located rearward of the second door in the longitudinal direction to permit visualization of an opera window viewing area located outside of the vehicle proximate the another side thereof by an operator positioned in the operator cabin adjacent the one side of the vehicle in use of the vehicle.

In some embodiments, the operator cabin may include a steering wheel, an operator seat, and a rack arranged in the operator cabin opposite the steering wheel and the operator seat that includes a plurality of trays. The operator cabin may include a pair of tracks affixed to a floor of the operator cabin and spaced apart from one another in the longitudinal direction, and the rack may be movable along the pair of tracks in a lateral direction perpendicular to the longitudinal direction between a stowed position, in which the rack is disposed distant from the operator seat, and a delivery position, in which the rack is disposed close to the operator seat. The land vehicle may have a gross vehicular weight rating (GVWR) of between 10,001 pounds and 14,000 pounds In some embodiments, the land vehicle may include an opera window mirror mounted to the second sidewall in close proximity to the opera window to permit visualization of an opera window mirror viewing area located outside of the vehicle proximate the another side thereof by an operator positioned in the operator cabin adjacent the one side of the vehicle in use of the vehicle, and the opera window mirror viewing area may extend at least partially rearward of the opera window viewing area in the longitudinal direction. The land vehicle may include a side mirror mounted between the second door and a front windshield of the vehicle to permit visualization of a side mirror viewing area located outside of the vehicle proximate the another side thereof by an operator positioned in the operator cabin adjacent the one side of the vehicle in use of the vehicle, and the side mirror viewing area may extend at least partially rearward of the opera window mirror viewing area in the longitudinal direction. The land vehicle may include a camera system affixed to the side mirror.

In some embodiments, the land vehicle may include a plurality of electric motors to generate rotational power that are supported by the plurality of wheels, and one of the plurality of electric motors may be integrated directly into each one of the plurality of wheels. Additionally, in some embodiments, the land vehicle may include a brake system coupled to each one of the plurality of wheels, and each brake system may include a disc having a plurality of notches defined between circumferentially adjacent teeth of the disc, a first braking device configured to contact an outer face of the disc to resist rotation of one of the plurality of wheels, a second braking device circumferentially spaced from the first braking device about the disc that is configured to contact the outer face of the disc to resist rotation of the one of the plurality of wheels, and a third braking device configured to contact one or more teeth of the disc to resist rotation of the one of the plurality of wheels.

In some embodiments, the land vehicle may include an impact management system supported by the frame structure and positioned forward of the operator cage in the longitudinal direction, the frame structure may include a pair of rails that each extends in the longitudinal direction from a first end arranged adjacent a pair of front wheels of the vehicle to a second end arranged adjacent a pair of rear wheels of the vehicle, the impact management system may be configured to deform in response to impact forces applied thereto in use of the land vehicle to maintain structural integrity of the operator cage and the pair of rails, and the impact management system may include a crash cage extending in the longitudinal direction from the first ends of the pair of rails to a forward-most point of the land vehicle. Additionally, in some embodiments, the land vehicle may include (i) a first door handle mounted to the first door that includes a first lock and a first fingerprint identification feature configured to receive a fingerprint provided by an operator and (ii) a second door handle mounted to the second door that includes a second lock and a second fingerprint identification feature configured to receive a fingerprint provided by an operator, operation of the first lock may be controlled based on the fingerprint received by the first fingerprint identification feature, and operation of the second lock may be controlled based on the fingerprint received by the second fingerprint identification feature.

In some embodiments, the land vehicle may include a cap roof coupled to each of the first and second sidewalls that covers the operator cage and the rear compartment, a gutter may extend in the longitudinal direction above the first door to define an overhang above the first door, and the gutter may be integrally formed with the cap roof. The land vehicle may include a gutter light arranged in close proximity to the gutter to illuminate an area located outside of the vehicle adjacent the first door in use of the vehicle.

In some embodiments, the cap roof may have a single-piece construction. Additionally, in some embodiments, the land vehicle may include a canopy coupled to the cap roof that includes a first canopy section and a second canopy section spaced from the first canopy section in the longitudinal direction, and one of the first canopy section and the second canopy section may be movable relative to the cap roof and the other of the first canopy section and the second canopy section in the longitudinal direction between an open position, in which access to a storage recess is permitted, and a closed position, in which access to the storage recess is restricted. The canopy may be at least partially movable relative to the cap roof to selectively permit overhead airborne delivery of one or more items into the storage recess.

In some embodiments, the operator cabin may include a control panel having a plurality of modular units each configured for individual removal and/or replacement without requiring removal and/or replacement of any of the other modular units. Additionally, in some embodiments, the operator cabin may include a floor that is arranged a first distance in a vertical direction above a support surface on which the land vehicle is positioned, and the vehicle may include a step arranged on the one side of the vehicle to facilitate entry into, and exit from, the operator cabin from the one side of the vehicle. The step may be positioned in the vertical direction between the floor and the support surface, and the step may be arranged a second distance in the vertical direction above the support surface which is less than the first distance. In some embodiments, only one step may be provided to facilitate entry into, and exit from, the operator cabin from the one side of the vehicle.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 21 is a partial perspective view taken from inside the operator cabin of the electric vehicle of FIG. 1 showing the side mirror and an opera window mirror viewable by an operator seated in the operator cabin;

DETAILED DESCRIPTION OF ILLUSTRATIVE EMBODIMENTS

Figure 1:
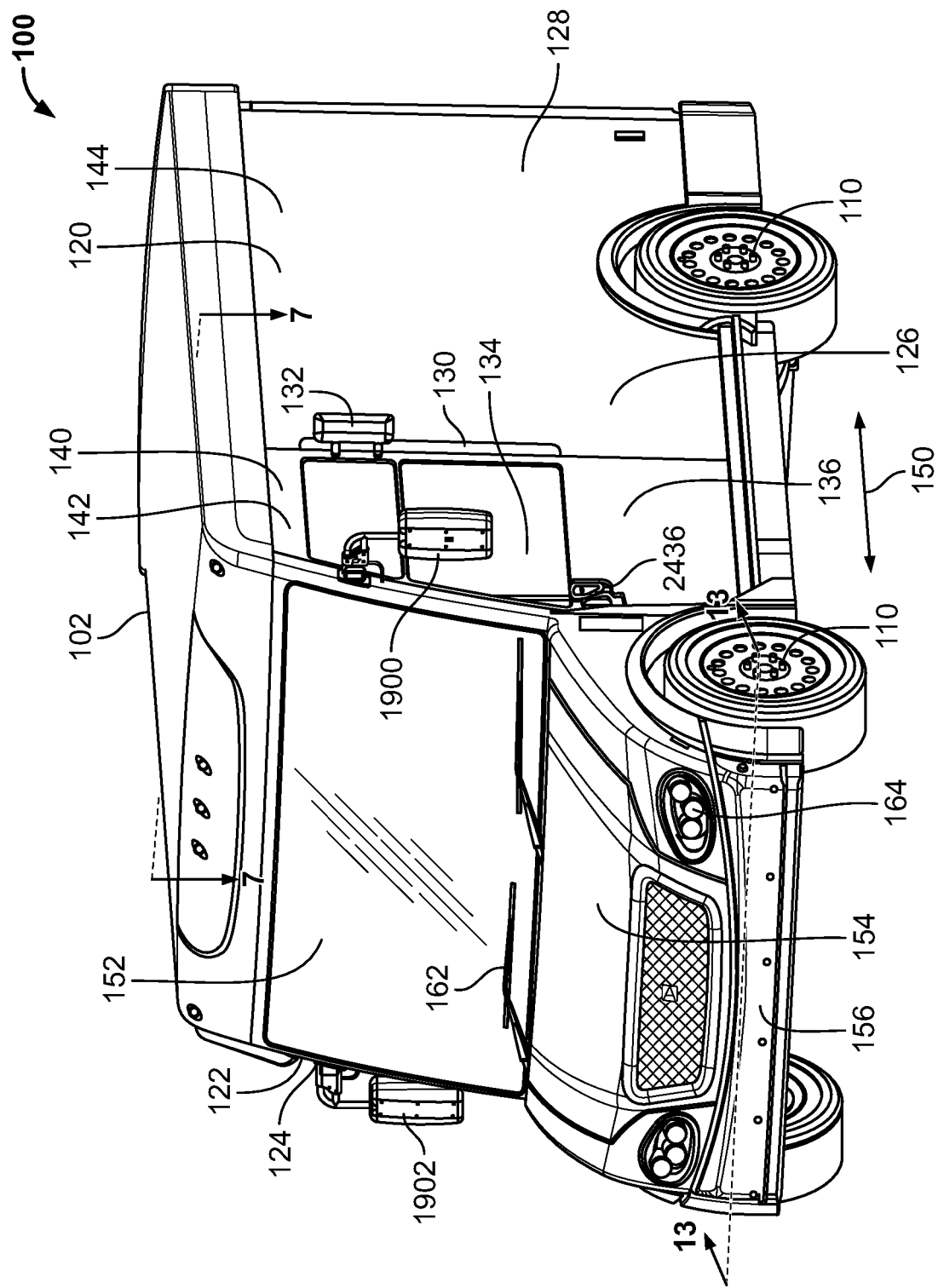
FIG. 1 is a perspective view of an electric vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Figure 2:
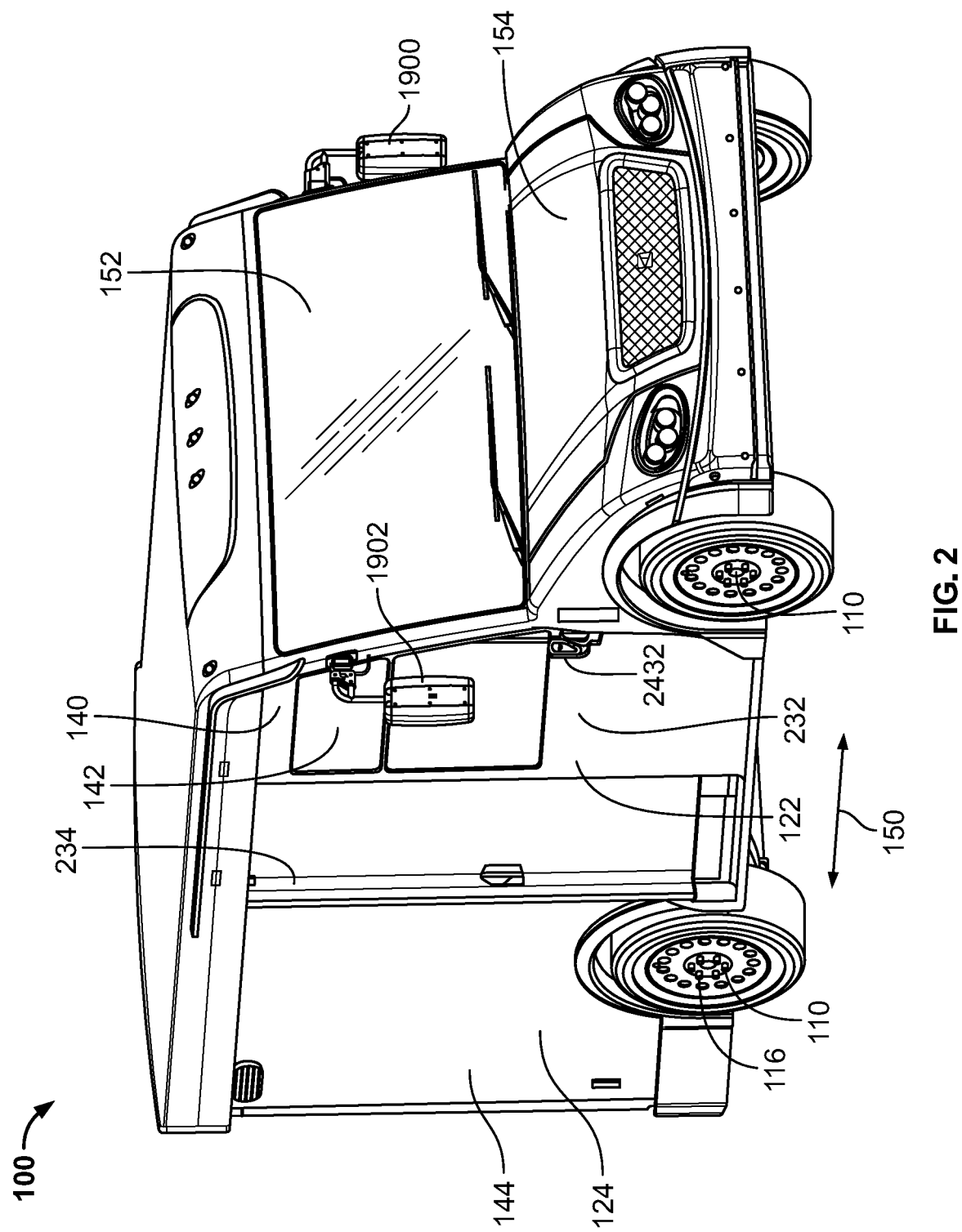
FIG. 2 is another perspective view of the electric vehicle of FIG. 1.
Figure 3:
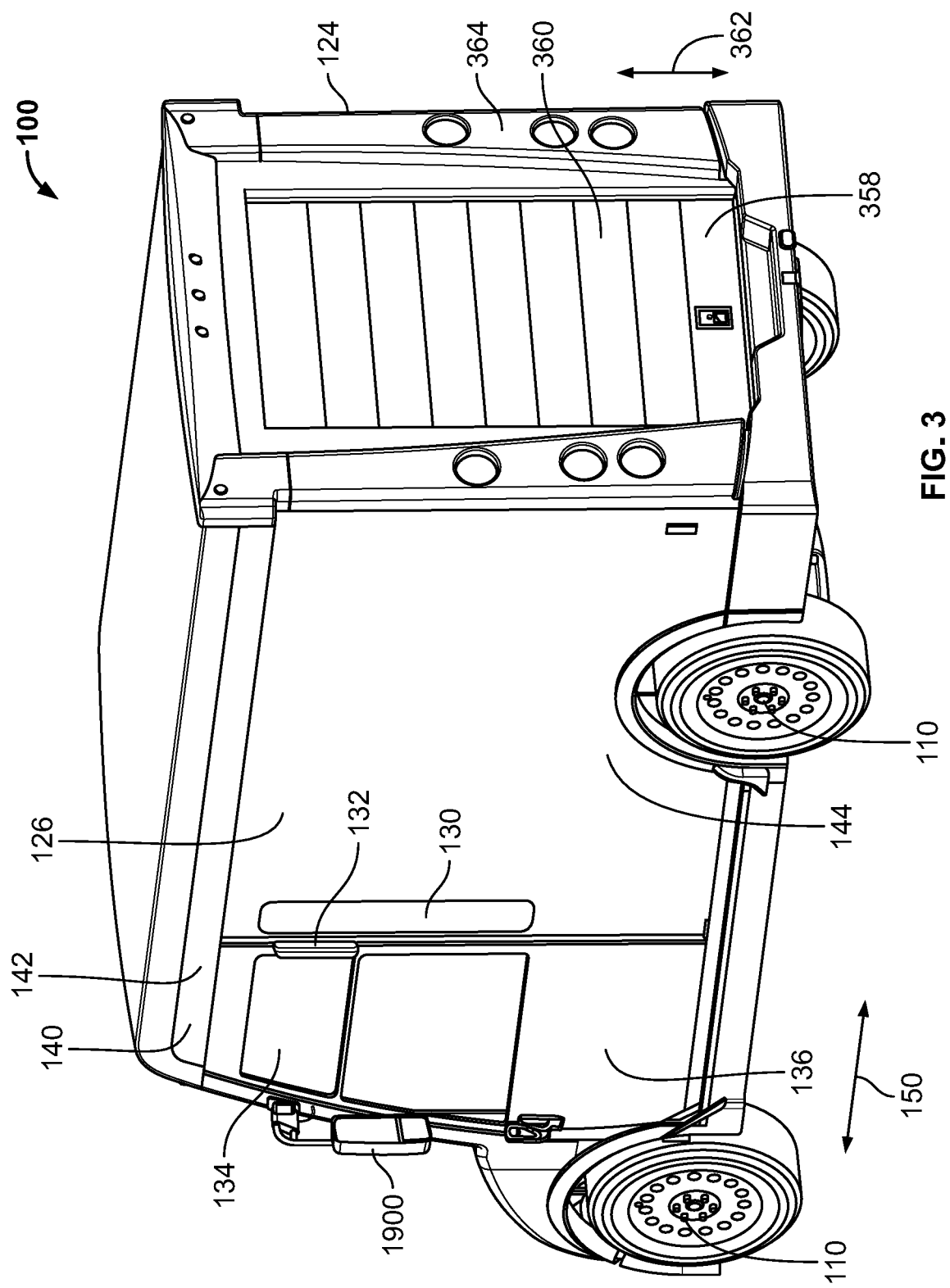
FIG. 3 is yet another perspective view of the electric vehicle of FIG. 1.

Referring now to FIGS. 1-3, an illustrative land vehicle 100 is embodied as, or otherwise includes, an electric delivery vehicle 102, such as an electric delivery truck adapted for any use as a delivery vehicle, for example. In the illustrative embodiment, the electric delivery vehicle 102 is adapted for use as a mail delivery vehicle that may be employed by the United States Postal Service. Of course, in other embodiments, the electric delivery vehicle 102 may be configured for use in a variety of other suitable applications. Furthermore, in other embodiments, the land vehicle 100 may be embodied as, or otherwise include, an electric utility van.

In some embodiments, the illustrative electric delivery vehicle 102 is a postal delivery truck. Additionally, in some embodiments, the illustrative delivery vehicle 102 is a non-postal delivery truck. In embodiments in which the delivery vehicle 102 is a non-postal delivery truck, the vehicle 102 may be employed in a variety of applications, such as the applications mentioned below, for example.

The illustrative land vehicle 100 may include one or more features of the electric vehicle described in co-pending U.S. patent application Ser. No. 17/546,641, such as the impact management system 1500 (see FIG. 15), for example. Additionally, the illustrative land vehicle 100 may include one or more features of the electric vehicle described in co-pending U.S. patent application Ser. No. 17/546,593, such as electric motors 1700 (see FIG. 17), for example. Furthermore, the illustrative land vehicle 100 may include one or more features of the electric vehicle described in co-pending U.S. patent application Ser. No. 17/546,500, such as brake systems 1800 (see FIG. 18), for example. The disclosures of those applications are incorporated herein by reference in their entireties.

In some embodiments, the illustrative land vehicle 100 may include a monocoque, such as one of the monocoques described in U.S. patent application Ser. No. 17/142,766. Furthermore, in some embodiments, a monocoque of the illustrative land vehicle 100 may be formed using a modular mold system, such as one of the modular mold systems described in U.S. patent application Ser. No. 17/142,766. Further still, in some embodiments, a monocoque of the illustrative land vehicle 100 may be formed according to the methods described in U.S. patent application Ser. No. 17/142,785. The disclosures of those applications are incorporated herein by reference in their entireties.

It should be appreciated that the land vehicle 100 may be employed in a variety of applications, as indicated above. In some embodiments, the land vehicle 100 may be embodied as, or otherwise included in, a fire and emergency vehicle, a refuse vehicle, a coach vehicle, a recreational vehicle or motorhome, a municipal and/or service vehicle, an agricultural vehicle, a mining vehicle, a specialty vehicle, an energy vehicle, a defense vehicle, a port service vehicle, a construction vehicle, and a transit and/or bus vehicle, just to name a few. Additionally, in some embodiments, the vehicle 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

The illustrative land vehicle 100 includes a frame structure 1600 (see FIG. 16), wheels 110 supported by the frame structure 1600, and a body 120 supported by the frame structure 1600. The frame structure 1600 includes, or otherwise at least partially defines, an operator cage 140 that at least partially defines an operator cabin 142 and a rear compartment 144 positioned rearward of the operator cage 140 in a longitudinal direction 150 (i.e., in the lengthwise direction of the vehicle 100). In the illustrative embodiment, the body 120 includes a sidewall 122 arranged on a right side 124 of the vehicle 100 (i.e., when the vehicle 100 is viewed from the rear) and a sidewall 126 arranged on a left side 128 of the vehicle 100 opposite the sidewall 122. The sidewalls 122, 126 extend in the longitudinal direction 150 such that the sidewalls 122, 126 cooperate to at least partially define the operator cage 140 and the rear compartment 144. However, as mentioned above, in other embodiments, the land vehicle 100 may include a monocoque. In one example, the monocoque may be provided in place of the frame structure 1600. In another example, the monocoque may be provided in addition to the frame structure 1600. In yet another example, the frame structure 1600 may serve as an reinforcement structure which is disposed internally in the monocoque, and the monocoque may be disposed externally to the frame structure 1600.

The illustrative sidewall 122 includes a door 232 (see FIG. 2) to provide access to the operator cabin 142 from the right side 124 of the vehicle 100. Similarly, the sidewall 126 includes a door 136 to provide access to the operator cabin 142 from the left side 128 of the vehicle 100. The doors 136, 232 are aligned with one another in the longitudinal direction 150. At least in some embodiments, the doors 136, 232 cooperate to at least partially define the operator cabin 142. As best seen in FIGS. 1 and 3, the sidewall 126 includes an opera window 130 that is located rearward of the door 136 in the longitudinal direction 150. As discussed in greater detail below, in use of the vehicle 100, the opera window 130 permits visualization of an opera window viewing area 2210 (see FIG. 22) that is located outside of the vehicle 100 proximate the left side 128 thereof by an operator positioned in the operator cabin 142 adjacent the right side 124 of the vehicle 100.

The illustrative vehicle 100 includes a windshield 152 and a hood 154 arranged at, or in close proximity to, a front end 156 of the vehicle 100. The vehicle 100 also includes a rear door 358 (see FIG. 3) arranged opposite the windshield 152 and the hood 154 at, or in close proximity to, a rear end 360 of the vehicle 100 that is at least partially defined by a rear wall 364 of the vehicle 100. The windshield 152 permits an operator located in the operator cabin 142 to observe objects disposed in front of the vehicle 100. The hood 154 at least partially defines an internal cavity 1402 (see FIG. 14) in which various structures of the vehicle 100 are disposed, such as the impact management system 1500, for example. The rear door 358 is movable in a vertical direction 362 to allow access to the rear compartment 144 of the vehicle 100.

As described in greater detail below with reference to FIG. 4, the illustrative vehicle 100 includes a cap roof 400. The cap roof 400 extends in the longitudinal direction 150 from the front end 156 of the vehicle 100 to the rear end 360 thereof. The cap roof 400 is coupled to each of the sidewalls 122, 126 such that the cap roof 400 covers the operator cage 140 and the rear compartment 144. It should be appreciated that at least in some embodiments, the cap roof 400 cooperates with the sidewalls 122, 126 and the windshield 152 to at least partially define the operator cage 140. Furthermore, in at least some embodiments, the cap roof 400 cooperates with the sidewalls 122, 126 and the rear door 358 to at least partially define the rear compartment 144.

In the illustrative embodiment, the vehicle 100 includes an opera window mirror 132 mounted to the sidewall 126 in close proximity to the opera window 130. More specifically, at least in some embodiments, the opera window mirror 132 is mounted to the sidewall 126 such that the opera window mirror 132 is located in the longitudinal direction 150 between a window 134 formed in the door 136 and the opera window 130. In any case, in use of the vehicle 100, the opera window mirror 132 permits visualization of an opera window mirror viewing area 2220 (see FIG. 22) that is located outside of the vehicle 100 proximate the left side 128 thereof by an operator positioned in the operator cabin 142 adjacent the right side 124 of the vehicle 100. As discussed below with reference to FIG. 22, at least in some embodiments, the opera window mirror viewing area 2220 extends at least partially rearward of the opera window viewing area 2210 in the longitudinal direction 150.

The illustrative vehicle 100 includes a side mirror 1900 (see FIG. 19) mounted between the windshield 152 and the door 136. Further details of the side mirror 1900 are discussed below with reference to FIG. 19. In use of the vehicle 100, the side mirror 1900 permits visualization of a side mirror viewing area 2230 (see FIG. 22) that is located outside of the vehicle 100 proximate the left side 128 thereof by an operator positioned in the operator cabin 142 adjacent the right side 124 of the vehicle 100. As discussed below with reference to FIG. 22, at least in some embodiments, the side mirror viewing area 2230 extends at least partially rearward of the opera window mirror viewing area 2220 in the longitudinal direction 150.

In the illustrative embodiment, the vehicle 100 includes a door handle 2436 (see FIG. 24) mounted to the door 136. In some embodiments, the door handle 2436 is mounted to the door 136 such that the door handle 2436 and the side mirror 1900 are substantially aligned in the longitudinal direction 150. As described in greater detail below with reference to FIG. 24, the illustrative door handle 2436 includes a lock 2438 and a fingerprint identification feature 2440.

Figure 19:
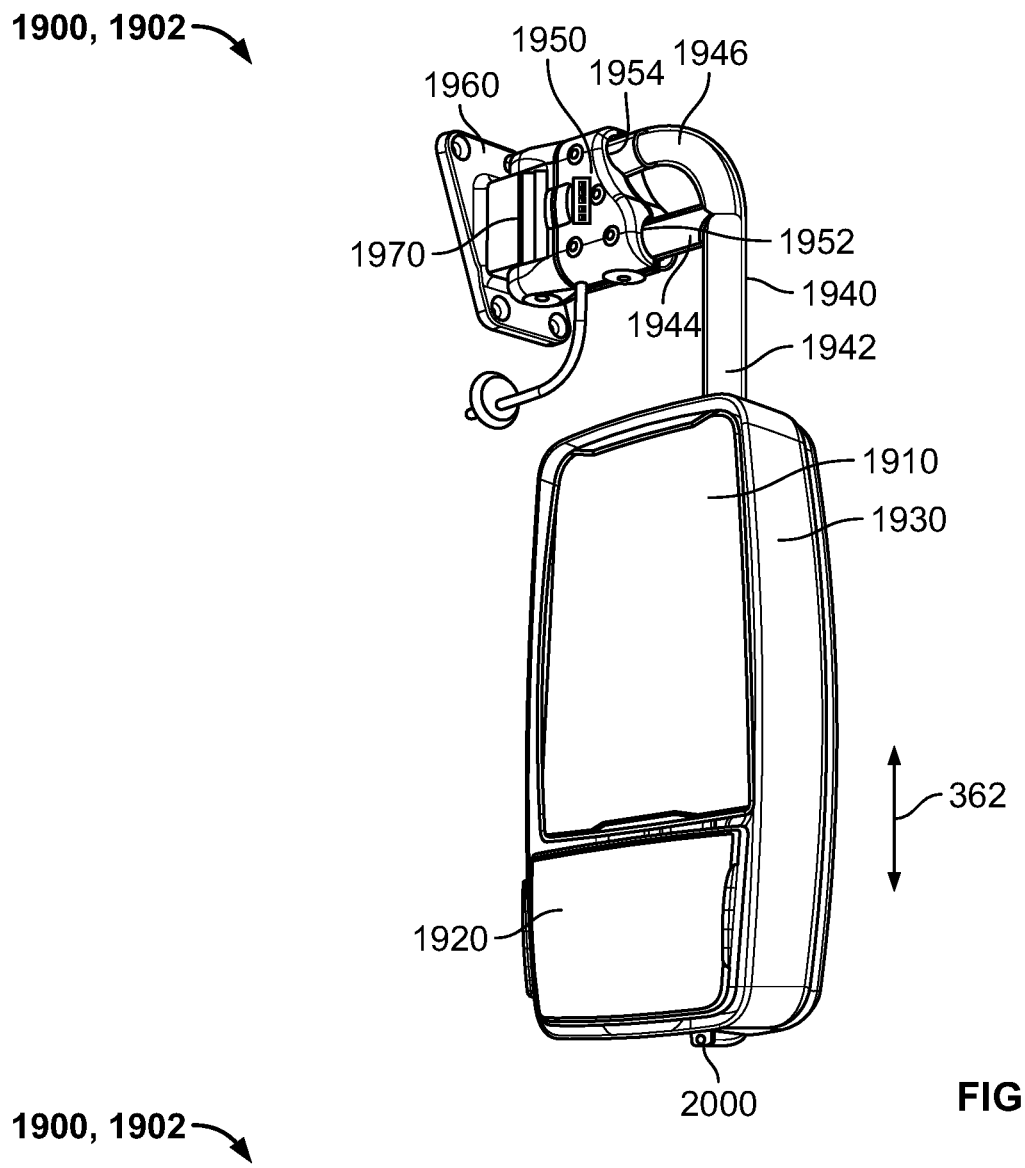
FIG. 19 is a perspective view of a side mirror configured for attachment to the electric vehicle of FIG. 1.
Figure 20:
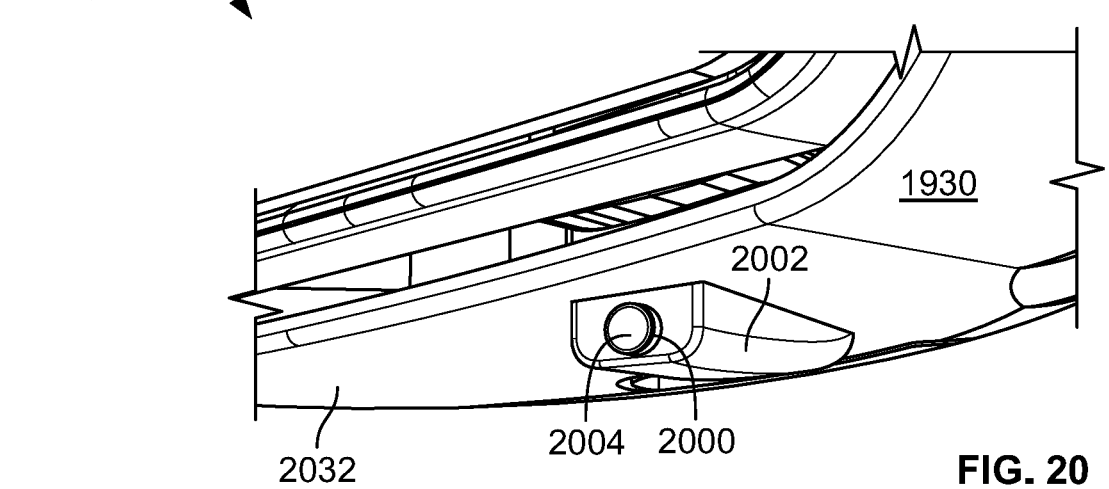
FIG. 20 is a detail view of the side mirror depicted in FIG. 19 showing a camera system affixed to the side mirror.

As shown in FIG. 2, the illustrative vehicle 100 includes a side mirror 1902 that is mounted between the windshield 152 and the door 232. For the purposes of the present disclosure, the side mirrors 1900, 1902 are substantially identical. Accordingly, the discussion of the side mirror 1900 below with reference to FIGS. 19 and 20 is applicable in its entirety to the side mirror 1902.

Unlike the sidewall 126, the illustrative sidewall 122 is not formed to include an opera window (e.g., like the opera window 130). Furthermore, unlike the sidewall 126, an opera window mirror (e.g., like the opera window mirror 132) is not mounted to the illustrative sidewall 122. Instead, in the illustrative embodiment, the sidewall 122 includes a side door 234 positioned in the longitudinal direction 150 between the door 232 and a rear wheel 116 of the wheels 110. At least in some embodiments, the side door 234 is movable in the longitudinal direction 150 to provide access to the rear compartment 144 from the right side 124 of the vehicle 100.

In the illustrative embodiment, the vehicle 100 includes a door handle 2432 (see FIG. 24) mounted to the door 232. In some embodiments, the door handle 2432 is mounted to the door 232 such that the door handle 2432 and the side mirror 1902 are substantially aligned in the longitudinal direction 150. As described in greater detail below with reference to FIG. 24, the illustrative door handle 2432 includes a lock 2442 and a fingerprint identification feature 2444 configured to control operation of the lock 2442 based on a fingerprint provided by an operator.

Figure 4:
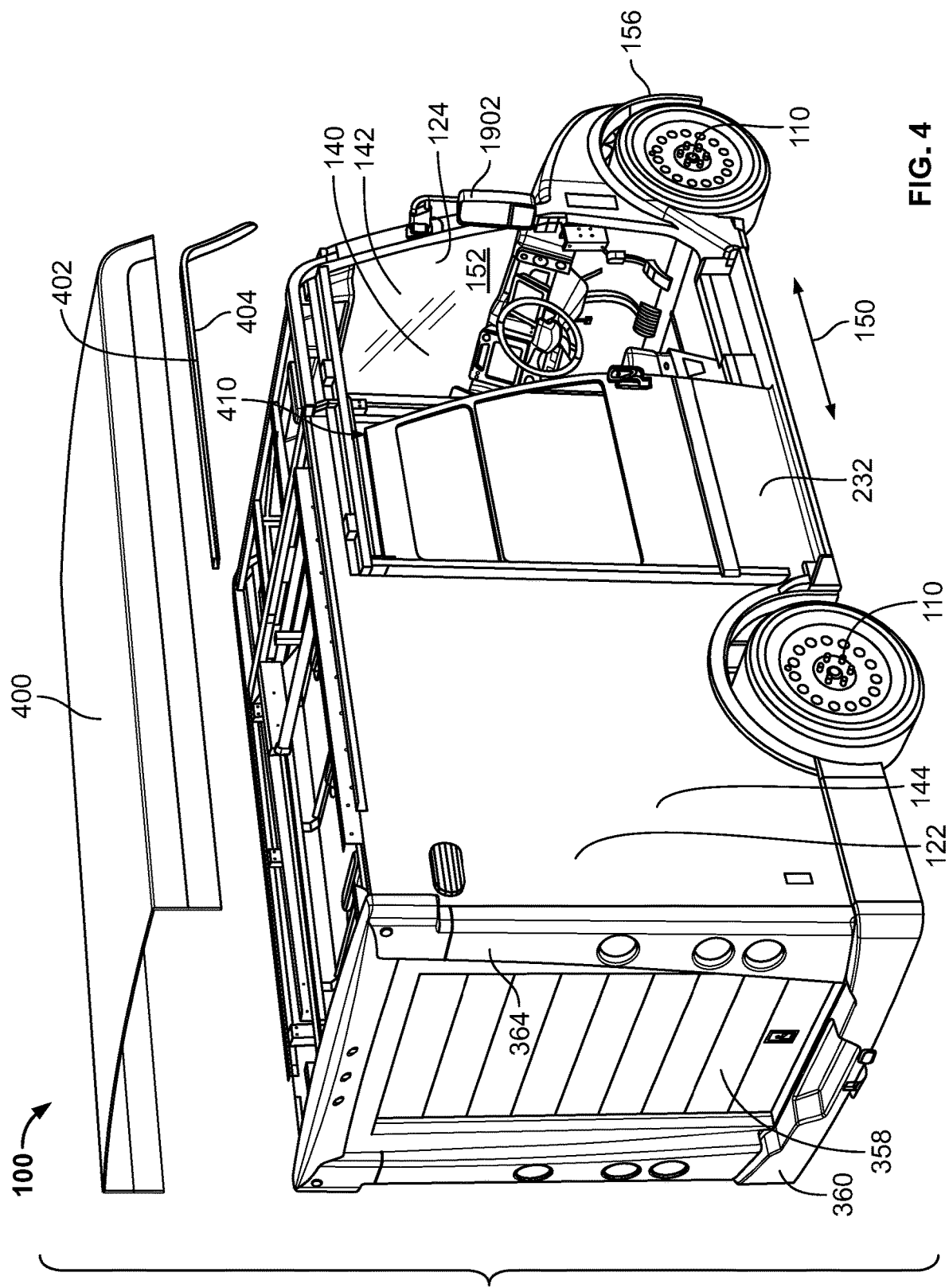
FIG. 4 is yet another perspective view still of the electric vehicle of FIG. 1 showing a cap roof of the vehicle.

Referring now to FIG. 4, for the sake of simplicity, an exploded view of the cap roof 400 is illustrated. In the illustrative embodiment, however, it should be appreciated that the cap roof 400 has a single-piece construction. Additionally, in some embodiments, the cap roof 400 may be a monolithic structure. In any case, the cap roof 400 is coupled to the sidewalls 122, 126 and the rear wall 364 to at least partially cover and enclose the operator cage 140 and the rear compartment 144.

The cap roof 400 is integrally formed with, and/or includes, a gutter 402. In the illustrative embodiment, the gutter 402 extends in the longitudinal direction 150 to define an overhang 404 above the door 232. More specifically, the illustrative gutter 402 extends in the longitudinal direction 150 to define the overhang 404 above the door 232 when the door 232 is an opened position 410, in which access to the operator cabin 142 from the right side 124 of the vehicle 100 is permitted, and when the door 232 is a closed position 520 (see FIG. 5), in which access to the operator cabin 142 from the right side 124 of the vehicle 100 is restricted.

It should be appreciated that the illustrative gutter 402 is embodied as, or otherwise includes, any structure or collection of structures capable of defining the overhang 404 above the door 232. In some embodiments, the gutter 402 is embodied as, or otherwise includes, one or more flaps, panels, strips, bars, or the like that are integrally formed with the cap roof 400. In any case, it should further be appreciated that the gutter 402 is arranged to provide some degree of overhead protection from weather elements (e.g., precipitation) falling in close proximity to the sidewall 122 in use of the vehicle 100. In some embodiments, the gutter 402 may be capable of collecting and/or diverting precipitation away from the sidewall 122 in use of the vehicle 100.

In some embodiments, the cap roof 400 may provide only a single gutter (i.e., the gutter 402) that is arranged on the right side 124 of the vehicle 100 above the door 232. In such embodiments, the cap roof 400 does not provide a gutter arranged on the left side 128 of the vehicle 100 above the door 136. In other embodiments, the cap roof 400 may provide a gutter arranged on each one of the right and left sides 124, 128 of the vehicle 100 above the respective doors 232, 136.

Figure 5:
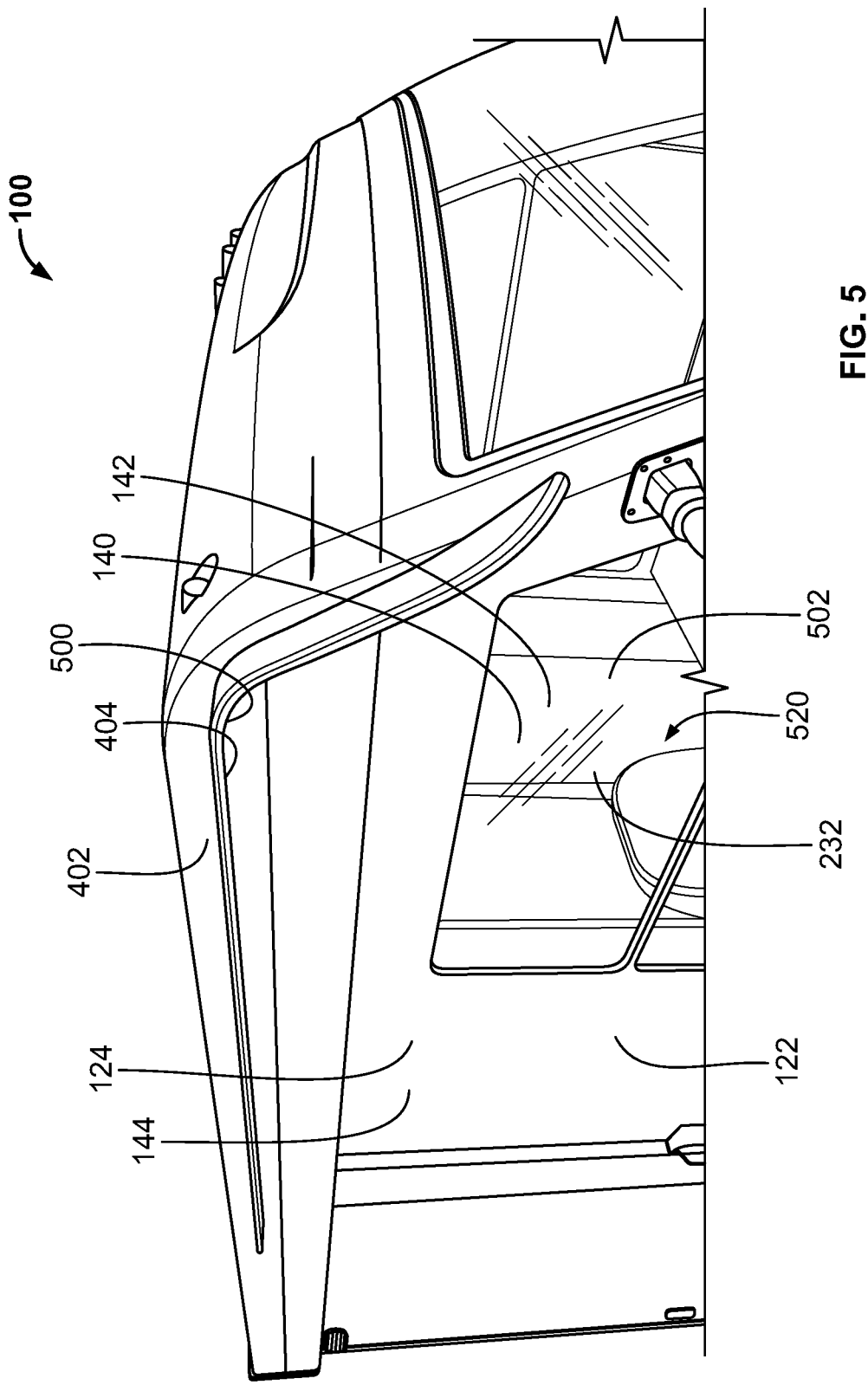
FIG. 5 is a partial perspective view of the electric vehicle of FIG. 1 showing a gutter that defines an overhang above a door of the vehicle and a gutter light arranged in close proximity to the gutter.

Referring now to FIG. 5, in the illustrative embodiment, the vehicle 100 includes a gutter light 500 arranged in close proximity to the gutter 402. At least in some embodiments, the gutter light 500 is arranged beneath, and/or interiorly of, the gutter 402 such that the gutter light 500 is at least partially covered by the gutter 402 and/or the overhang 404. The illustrative gutter light 500 is embodied as, or otherwise includes, any light source or collection of light sources capable of illuminating an area 502 located outside of the vehicle 100 along the right side 124 thereof adjacent the door 232. As such, in use of the vehicle 100, the gutter light 500 may illuminate one or more objects located in the area 502 to facilitate visualization of those objects by an operator positioned in the operator cabin 142 adjacent the right side 124 of the vehicle 100.

In some embodiments, the vehicle 100 includes only a single gutter light (i.e., the gutter light 500) that is arranged on the right side 124 of the vehicle 100 in close proximity to the gutter 402. In other embodiments, however, the vehicle 100 may include a gutter light arranged on each one of the right and left sides 124, 128 of the vehicle 100 above the respective doors 232, 136. In such embodiments, the cap roof 400 may provide a gutter arranged on each one of the right and left sides 124, 128 of the vehicle 100 above the corresponding gutter light.

Figure 6:
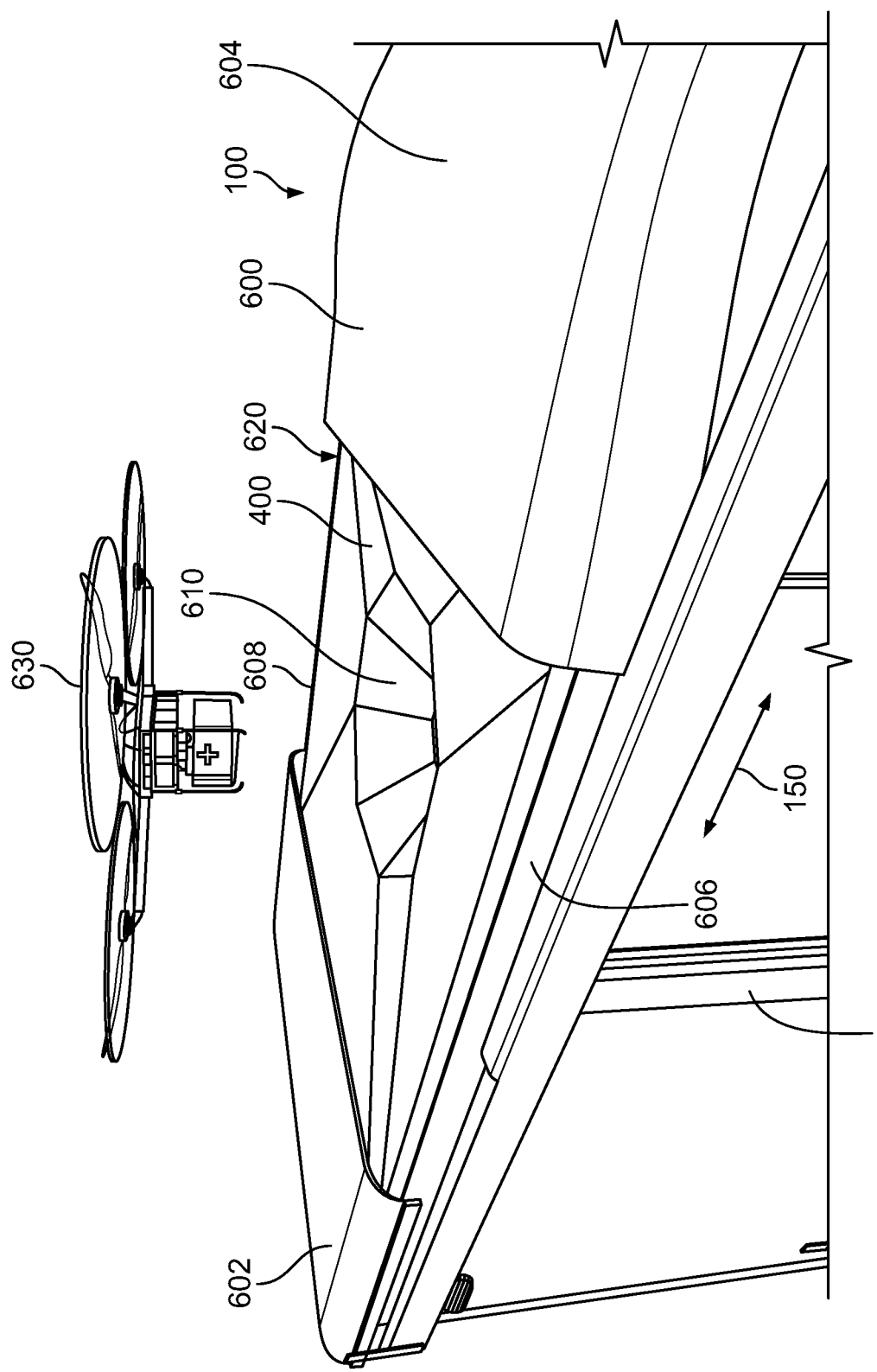
FIG. 6 is another partial perspective view of the electric vehicle of FIG. 1 showing a canopy movably coupled to a cap roof of the vehicle to selectively permit overhead airborne delivery of one or more items into a storage recess of the vehicle.

Referring now to FIG. 6, in the illustrative embodiment, the vehicle 100 includes a canopy 600 coupled to the cap roof 400. In some embodiments, the canopy 600 may be included in the cap roof 400. The canopy 600 is illustratively movable relative to the cap roof 400 in the longitudinal direction 150 to selectively permit access to a storage recess 610. The canopy 600 includes a canopy section 602 and a canopy section 604 that is spaced from the canopy section 602 in the longitudinal direction 150.

In the illustrative embodiment, one of the canopy sections 602, 604 is movable relative to the other of the sections 602, 604 in the longitudinal direction 150 between an opened position 620, in which access to the storage recess 610 is permitted, and a closed position (not shown), in which access to the storage recess 610 is restricted. In some embodiments, the one of the canopy sections 602, 604 may be movable relative to the other of the sections 602, 604 along a pair of roof rails 606, 608. The roof rails 606, 608 may be coupled to opposite sides of the cap roof 400 such that the roof rails 606, 608 extend in the longitudinal direction 150 along at least a portion of the cap roof 400.

In some embodiments, the storage recess 610 may be formed in the cap roof 400 such that the storage recess 610 extends at least partway through the cap roof 400. Furthermore, in some embodiments, the storage recess 610 may be formed in the cap roof 400 such that the storage recess 610 is in fluid communication with the rear compartment 144 of the vehicle 100. In some embodiments still, the storage recess 610 may be formed in the cap roof 400 to define a storage space (not shown) that is separate from, and located at least partially in, the rear compartment 144. In such embodiments, the storage space may be separated, divided, and/or partitioned from the rear compartment 144.

Regardless, the storage recess 610 is accessible from the top of the vehicle 100 as shown in FIG. 6. In some embodiments, when the one of the canopy sections 602, 604 is in the opened position 620 relative to the other of the canopy sections 602, 604, the storage recess 610 is accessible for airborne delivery of one of more items therein. Of course, it should be appreciated that airborne delivery of one or more items to the storage recess 610 may be accomplished using an aerial vehicle 630, which may be embodied as, or otherwise include, an unmanned aerial vehicle, a remotely-piloted aircraft, a drone, a remote controlled model aircraft, or the like.

Figure 7:
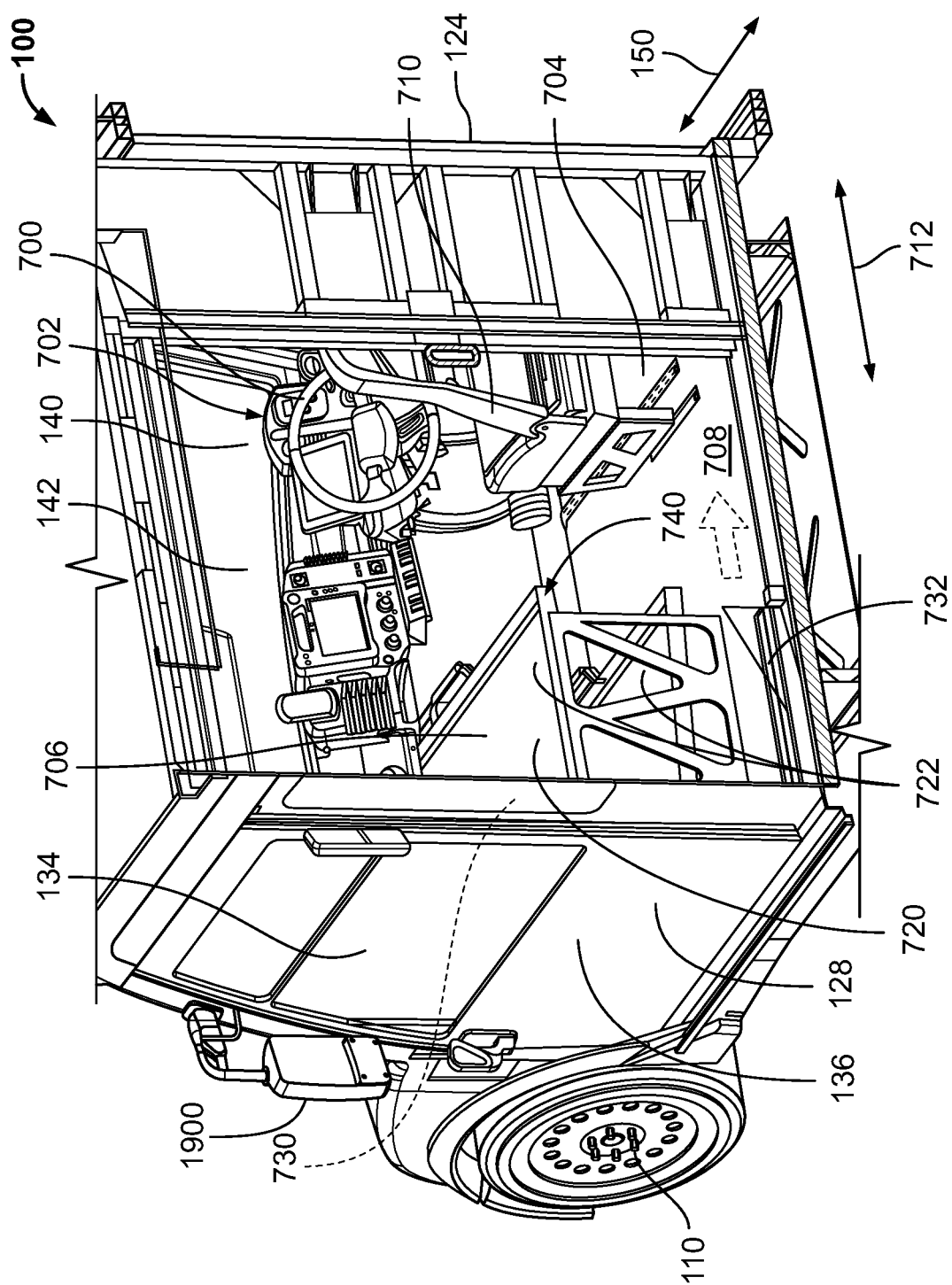
FIG. 7 is a sectional view of the electric vehicle of FIG. 1 taken about line 7-7 showing a rack in a stowed position in which the rack is disposed distant from an operator seat.
Figure 8:
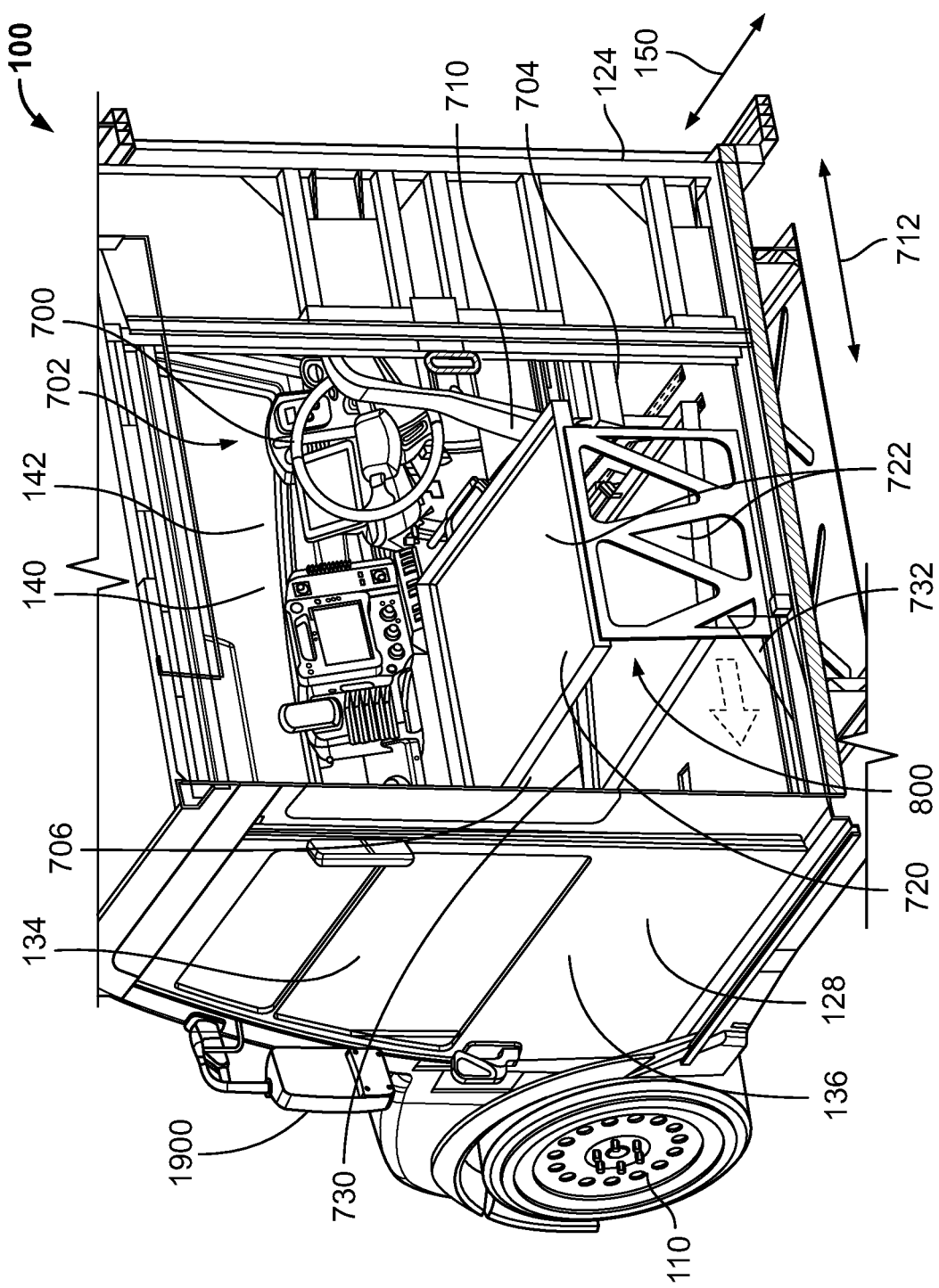
FIG. 8 is a sectional view similar to FIG. 7 showing the rack in a delivery position in which the rack is disposed close to the operator seat.

Referring now to FIGS. 7 and 8, the illustrative operator cabin 142 is shown in greater detail. Among other things, the operator cabin 142 includes, or otherwise houses, a steering wheel 700, an operator seat 710, and a rack 720 including trays 722. Further details of the operator cabin 142 are described below with reference to FIGS. 9-11.

The illustrative operator cabin 142 includes a right-hand drive configuration 702 in which the steering wheel 700 and the operator seat 710 are arranged on a right side 704 of the cabin 142 adjacent the right side 124 of the vehicle 100. It should be appreciated that the configuration 702 may facilitate curbside delivery from a driver seated in the operator seat 710 to a curbside mailbox, at least in some embodiments. In any case, in the illustrative right-hand drive configuration 702 of the operator cabin 142, the rack 720 is mounted on a left side 706 of the cabin 142 adjacent the left side 128 of the vehicle 100 and opposite the steering wheel 700 and the operator seat 710. As such, the rack 720 occupies a space that might otherwise be occupied by a passenger or driver seat in other configurations.

The illustrative operator cabin 142 includes, or otherwise houses, a pair of tracks 730, 732 that are affixed to a floor 708 of the cabin 142. The tracks 730, 732 are spaced apart from one another in the longitudinal direction 150 and arranged on the left side 706 of the cabin 142. In the illustrative embodiment, the rack 720 is movable in the operator cabin 142 along the tracks 730, 732 in a lateral direction 712 perpendicular to the longitudinal direction 150.

In the illustrative embodiment, the rack 720 is movable in the operator cabin 142 along the tracks 730, 732 in the lateral direction 712 between a stowed position 740 and a delivery position 800. In the stowed position 740 of the rack 720, the rack 720 is disposed distant from the operator seat 710. It should be appreciated that when the rack 720 is disposed in the stowed position 740, items (e.g., mail parcels, articles, documents, etc.) held by the trays 722 of the rack 720 may be located sufficiently far from the operator such that the operator may be required to leave the seat 710 to access the items. In the delivery position 800 of the rack 720, the rack 720 is disposed close to the operator seat 710. As a result, when the rack 720 is disposed in the delivery position 800, items held by the trays 722 of the rack 720 may be accessed by the operator without leaving the seat 710, at least in some embodiments.

It should be appreciated that in the United States, trucks are often classified according to their gross vehicular weight rating (GVWR) which may correspond to particular truck classifications and duty classifications given in Table 1 below. In some embodiments, the vehicle 100 has a GVWR (i.e., accounting for the weight of the truck when empty and the payload carrying capacity of the truck when full) of between 6,000 pounds and 19,800 pounds. Additionally, in some embodiments, the vehicle 100 has a GVWR of between 10,001 pounds and 14,000 pounds such that the vehicle 100 is embodied as, or otherwise includes, a Class 3 electric delivery truck. In one particular example, in some embodiments, the vehicle 100 has a 1000 cubic foot capacity and weighs roughly 6,500 pounds when empty and has a 6,000 pound payload capacity such that the vehicle 100 has a GVWR of about 12,500 pounds. Of course, it should be appreciated that in other embodiments, the vehicle 100 may be embodied as, or otherwise include, a Class 3 vehicle, a Class 4 vehicle, or a Class 5 vehicle.

TABLE 1

| US Truck Class | Duty Classification | Weight Limit |
| --- | --- | --- |
| Class 1 | Light Truck | 0-6,000 Pounds |
| Class 2a | Light Truck | 6,001-8,500 Pounds |
| Class 2b | Light/Medium Truck | 8,501-10,000 Pounds |
| Class 3 | Medium Truck | 10,001-14,000 Pounds |
| Class 4 | Medium Truck | 14,001-16,000 Pounds |
| Class 5 | Medium Truck | 16,001-19,500 Pounds |
| Class 6 | Medium Truck | 19,501-26,000 Pounds |
| Class 7 | Heavy Truck | 26,001-33,000 Pounds |
| Class 8 | Heavy Truck | 33,001 Pounds + |

It should be appreciated that in some embodiments, the illustrative cabin 142 may include a left-hand drive configuration in which the steering wheel 700 and the operator seat 710 are arranged on the left side 706 of the cabin 142. In such a left-hand drive configuration, the rack 720 may be mounted on the right side 704 of the cabin 142 opposite the steering wheel 700 and the operator seat 710. As such, the rack 720 may occupy a space that might otherwise be occupied by a passenger or driver seat in other configurations. Furthermore, in such a left-hand drive configuration, the tracks 730, 732 may be arranged on the right side 704 of the cabin 142.

In some embodiments, the vehicle 100 is embodied as, or otherwise includes, any one of a Class 3 through Class 5 electric delivery truck having a right-hand drive configuration. Additionally, in some embodiments, the vehicle 100 is embodied as, or otherwise includes, any one of a Class 3 through Class 5 electric delivery truck having a left-hand drive configuration. Further, in some embodiments still, the vehicle 100 is embodied as, or otherwise includes, any one of a Class 3 through Class 5 electric delivery truck having another suitable drive configuration, such as a configuration in which the steering wheel 700 and the operator seat 710 are centrally located in the cabin 142 in the lateral direction 712, for example.

Figure 9:
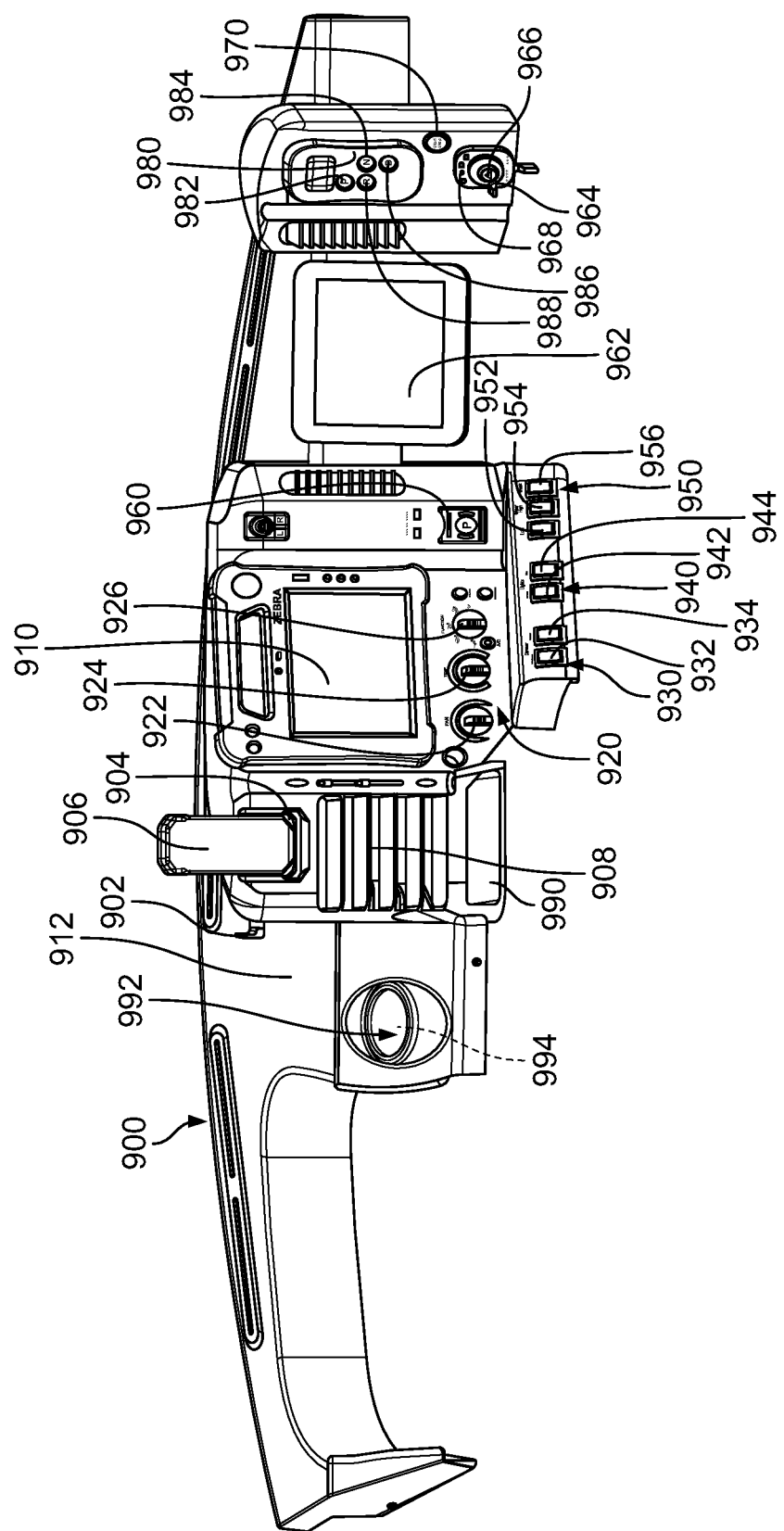
FIG. 9 is a perspective view of a control panel configured for positioning within an operator cabin of the electric vehicle of FIG. 1.
Figure 10:
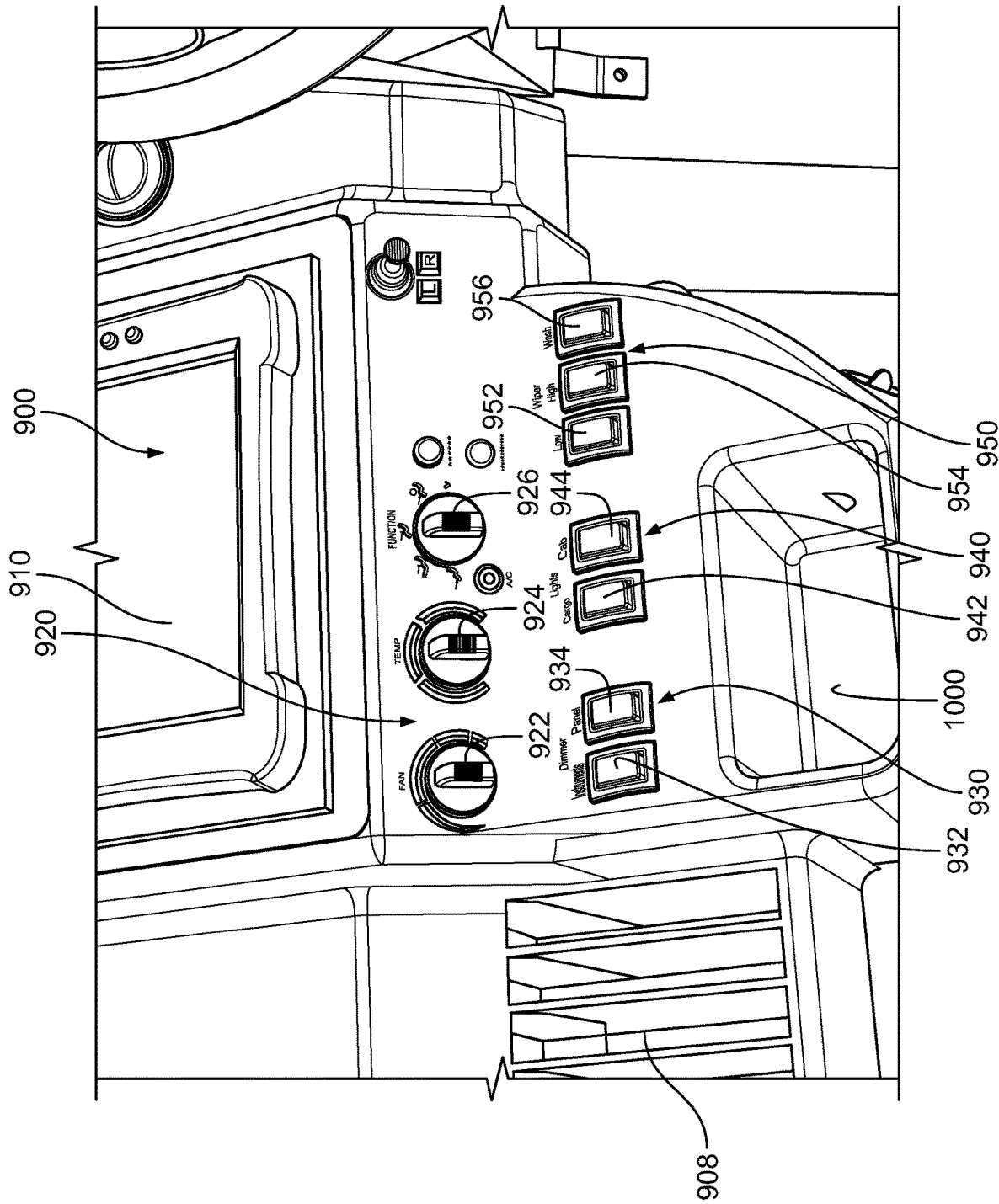
FIG. 10 is a magnified perspective view of a number of features that may be included in the control panel shown in FIG. 9.

Referring now to FIGS. 9 and 10, the operator cabin 142 includes, or otherwise houses, a control panel 900. For the sake of simplicity, the steering wheel 700 is shown omitted from the control panel 900. The illustrative control panel 900 is embodied as, or otherwise includes, a collection of knobs, switches, buttons, electronic devices, consoles, operator interfaces, and/or instruments capable of manipulation by an operator located in the operator cabin 142 to provide electronic input and/or data to a control system 2500 (see FIG. 25) of the vehicle 100, among other things. Based on the input and/or data provided to the control system 2500 from the control panel 900, the control system 2500 is configured to control various functions of the vehicle 100, as will be evident from the discussion that follows.

In the illustrative embodiment, the control panel 900 includes an operator display 910, HVAC controls 920, dimmer switches 930, light switches 940, wiper switches 950, an electronic parking brake (EPB) switch 960, a secondary display 962, a headlamp/hazard switch 964, a start/stop switch 970, and a shift selector panel 980. Of course, it should be appreciated that the control panel 900 may include other electronic instruments and/or devices in addition to, or as alternatives to, the aforementioned electronic devices. Furthermore, as discussed in greater detail below, the control panel 900 includes a number of mechanical components in addition to the electronic devices discussed above.

The illustrative operator display 910 may include, or otherwise be embodied as, an electronic instrument cluster, an instrument panel, a dashboard, or the like. The operator display 910 is configured to display information to an operator located in the operator cabin 142 in use of the vehicle 100. Such information may include, or otherwise be indicative of, operational characteristics of the vehicle 100, such as, but not limited to, the speed of the vehicle 100, the revolutions per minute (RPMs) of one of more electric motors of the vehicle 100, the operational state of one or more batteries of the vehicle 100 supplying electrical power to the electric motor(s), the mileage of the vehicle 100, one or more trip calculations for the vehicle 100, the selected operating range of the vehicle 100, images captured by one or more camera systems of the vehicle 100, and states of various devices (e.g., lights or lamps) of the vehicle 100. In some embodiments, information displayed by the operator display 910 may be in the form of a digital readout. Additionally, in some embodiments, the operator display 910 may provide one or more analog gauges for displaying the information to the operator. In some embodiments still, the operator display 910 may include a speedometer and/or a tachometer.

The illustrative HVAC controls 920 are embodied as, or otherwise include, a collection of switches, knobs, buttons, or the like that are capable of manipulation by an operator located in the operator cabin 142 to provide (i.e., in conjunction with the control system 2500) climate control therein. In the illustrative embodiment, the HVAC controls 920 include a fan control 922, a temperature control 924, and a function control 926. The fan control 922 is configured to control the level of operation of one more fans (not shown) to circulate air in the operator cabin 142. The temperature control 924 is configured to control the temperature of air circulated in the operator cabin 142. The function control 926 is configured to provide localized routing and/or directional control of the air circulated in the operator cabin 142.

The illustrative dimmer switches 930 are embodied as, or otherwise include, a collection of switches, knobs, buttons, or the like that are capable of manipulation by an operator located in the operator cabin 142 to provide (i.e., in conjunction with the control system 2500) brightness adjustment of various indicators and/or instruments in the operator cabin 142. In the illustrative embodiment, the dimmer switches 930 include an instrument dimmer switch 932 and a panel dimmer switch 934. The instrument dimmer switch 932 is configured to adjust the brightness of one or more electronic instruments located in the operator cabin 142. In some embodiments, the instrument dimmer switch 932 may be configured to adjust the brightness of one or more electronic instruments displayed on the operator display 910 and/or the secondary display 962. The panel dimmer switch 934 is configured to adjust the brightness of one or more indicators located in the operator cabin 142. In some embodiments, the panel dimmer switch 934 is configured to adjust the brightness of one or more indicators displayed on the operator display 910 and/or the secondary display 962.

The illustrative light switches 940 are embodied as, or otherwise include, a collection of switches, knobs, buttons, or the like that are capable of manipulation by an operator located in the operator cabin 142 to control (i.e., in conjunction with the control system 2500) operation of various lights of the vehicle 100. In the illustrative embodiment, the light switches 940 include a cargo light switch 942 and a cabin light switch 944. The cargo light switch 942 is configured to control the operation (i.e., turn on/off) of one or more lights located in the rear compartment 144 of the vehicle 100. The cabin light switch 944 is configured to control the operation (i.e., turn on/off) of one or more lights located in the operator cabin 142 of the vehicle 100.

The illustrative wiper switches 950 are embodied as, or otherwise include, a collection of switches, knobs, buttons, or the like that are capable of manipulation by an operator located in the operator cabin 142 to control (i.e., in conjunction with the control system 2500) operation of windshield wipers 162 (see FIG. 1) of the vehicle 100. In the illustrative embodiment, the wiper switches 950 include switches dedicated to controlling different operational states of the windshield wipers 162 in use of the vehicle 100. More specifically, the wiper switches 950 include a wiper switch 952 to control operation of the windshield wipers 162 in a low operational state, a wiper switch 954 to control operation of the windshield wipers 162 in a high operational state, and a wiper switch 956 to control operation of the windshield wipers 162 in a wash operational state.

The illustrative EPB switch 960 is embodied as, or otherwise includes, a switch, knob, button, or the like that is capable of manipulation by an operator located in the operator cabin 142 to control (i.e., in conjunction with the control system 2500) operation of an electronic parking brake mechanism 1830 (see FIG. 18) of the vehicle 100. At least in some embodiments, the EPB switch 960 may be depressed (e.g., one time) to activate the parking brake mechanism 1830 and thereby brake the vehicle 100 when the vehicle 100 is in a park operating range.

The illustrative secondary display 962 may include, or otherwise be embodied as, an electronic instrument cluster, an instrument panel, a dashboard, or the like. Similar to the operator display 910, the secondary display 962 may be configured to display information to an operator located in the operator cabin 142 in use of the vehicle 100. As such, the secondary display 962 may provide a redundant display means to the operator display 910, at least in some embodiments. In some embodiments, it should be appreciated that the secondary display 962 may be omitted.

The illustrative headlamp/hazard switch 964 is embodied as, or otherwise includes, a combination of switches, knobs, buttons, or the like that are capable of manipulation by an operator located in the operator cabin 142 to control (i.e., in conjunction with the control system 2500) operation of the headlamps or headlights 164 (see FIG. 1) and the hazard lights (not shown) of the vehicle 100. In some embodiments, the switch 964 may include a hazard light button 966 and a headlamp setting selector 968. In such embodiments, the switch 964 may be depressed (e.g., one time) to activate the hazard lights, and the position of the selector 968 may be adjusted to select a desired setting of the headlamps 164.

The illustrative start/stop switch 970 is embodied as, or otherwise includes, a switch, knob, button, or the like that is capable of manipulation by an operator located in the operator cabin 142 to control (i.e., in conjunction with the control system 2500) operation of the electric hub motors of the vehicle 100, which are described below in greater detail with reference to FIG. 17. In some embodiments, the start/stop switch 970 may be depressed once to start the electric hub motors and depressed again to stop the motors.

The illustrative shift selector panel 980 is embodied as, or otherwise includes, a combination of switches, knobs, buttons, or the like that are capable of manipulation by an operator located in the operator cabin 142 to select (i.e., in conjunction with the control system 2500) an operational range of the vehicle 100. In at least some embodiments, the vehicle 100 is operable in a number of discrete operational ranges, such as a park operating range, a neutral operating range, a drive operating range, and a reverse operating range, for example. Furthermore, in some embodiments, each of the discrete operational ranges may correspond to, or otherwise be associated with, a particular speed ratio at which rotational power is delivered (or not delivered in the case of selection of the park or neutral range) to the wheels 110 in use of the vehicle 100. In the illustrative embodiment, the shift selector panel 980 includes a park range button 982 to select the park operating range of the vehicle 100, a neutral range button 984 to select the neutral operating range of the vehicle 100, a drive range button 986 to select the drive operating range of the vehicle 100, and a reverse range button 988 to select the reverse operating range of the vehicle 100.

The illustrative control panel 900 also includes a number of mechanical features as indicated above. Those features include a band holder 902 to hold one or more rubber bands, a cradle 904 to support one or more electronic devices (e.g., such as the cell phone 906), multiple document trays 908 to carry one or more items (e.g., mail parcels or documents), lighted form bins 990 and 1000 (see FIG. 10) to hold one or more articles, and one or more cup holders 992 to hold one or more beverage containers that have drains 994 fluidly coupled to the outside of the vehicle 100. Of course, it should be appreciated that in other embodiments, the control panel 900 may include additional mechanical features and/or alternative mechanical features.

In the illustrative embodiment, the control panel 900 includes a number of modular units 912 each configured for individual removal and/or replacement without requiring removal and/or replacement of any of the other modular units. In some embodiments, one modular unit 912 may be dedicated to each one of the operator display 910, the HVAC controls 920, the dimmer switches 930, the light switches 940, the wiper switches 950, the electronic parking brake (EPB) switch 960, the secondary display 962, the headlamp/hazard switch 964, the start/stop switch 970, the shift selector panel 980, the band holder 902, the cradle 904, the document trays 908, the form bins 990, 1000, and the cup holders 994. In other embodiments, multiple features (i.e., of those listed above) may be included in one modular unit 912. In one example, one modular unit 912 may be dedicated to each of the operator display 910, the HVAC controls 920, the EPB switch 960, and the secondary display 962, another modular unit 912 may include the dimmer switches 930, the light switches 940, and the wiper switches 950, and yet another modular unit 912 may include the headlamp/hazard switch 964, the start/stop switch 970, and the shift selector panel 980.

Figure 11:
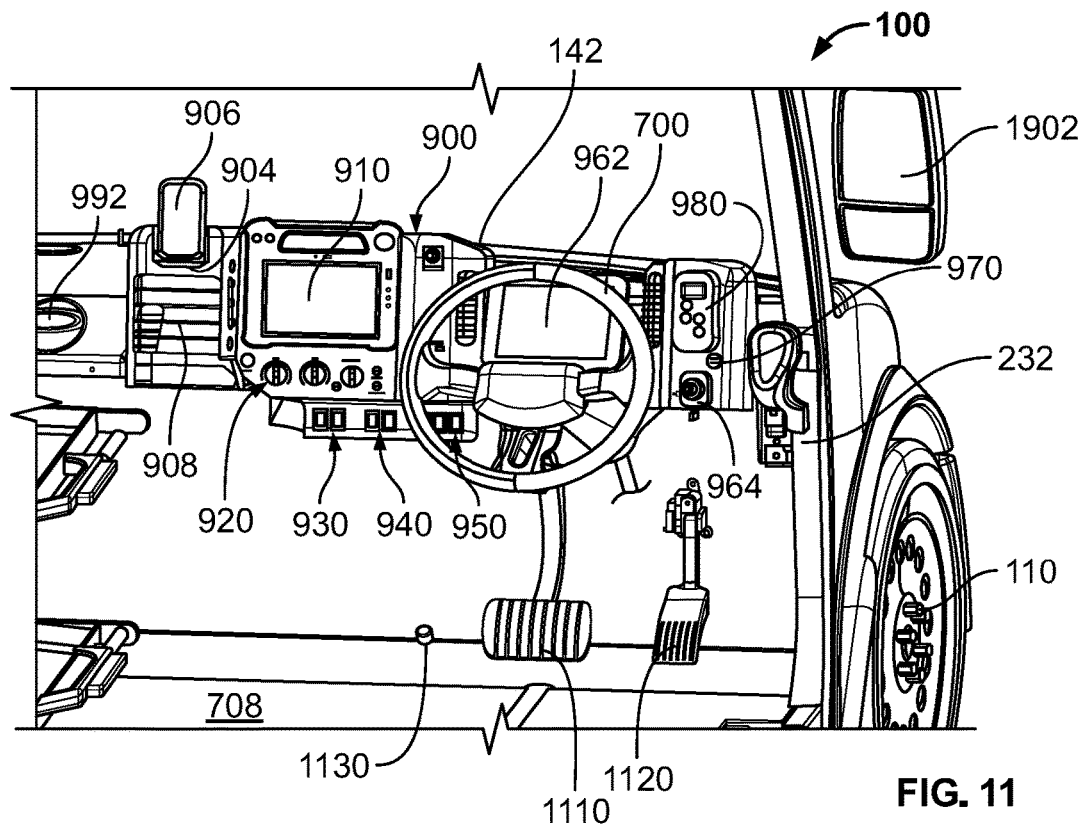
FIG. 11 is a partial perspective view taken from inside the operator cabin of the electric vehicle of FIG. 1 showing the control panel positioned therein.

Referring now to FIG. 11, the illustrative operator cabin 142 is depicted through the door 232 with the steering wheel 700 and the control panel 900 positioned therein. In the illustrative embodiment, a number of features are arranged proximate, and/or in contact with, the floor 708 of the operator cabin 142. Those features include a brake pedal 1110, an accelerator pedal 1120, and a power window switch 1130. The brake pedal 1110 is depressible by an operator to brake the vehicle 100 in use thereof using the brake systems 1800 described below. The accelerator pedal 1120 is depressible by an operator to drive forward or reverse movement of the vehicle 100 (i.e., depending on the operational mode selected with the panel 980) in use thereof using the electric motors 1700 discussed below. The power window switch 1130 is contactable by an operator to control movement (e.g., raising or lowering) of one of more windows located in and/or defining the operator cabin 142.

Figure 12:
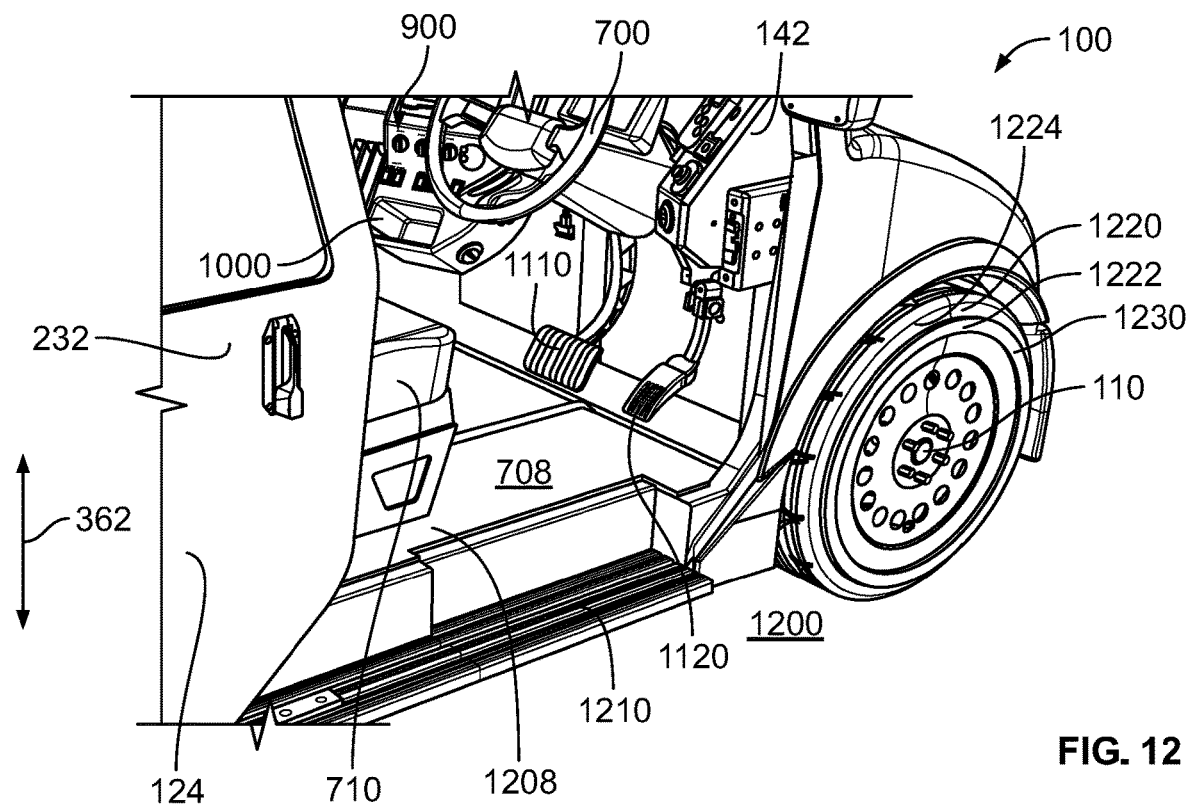
FIG. 12 is a partial perspective view taken from outside the operator cabin of the electric vehicle of FIG. 1 showing a floor of the operator cabin and at least one step arranged in a vertical direction between the floor and a support surface on which the vehicle is positioned.

Referring now to FIG. 12, the illustrative operator cabin 142 is shown in proximity to a support surface 1200 on which the vehicle 100 is positioned. In the illustrative embodiment, the floor 708 of the operator cabin 142 is arranged nineteen inches in a vertical direction 362 above the support surface 1200, although it should be appreciated that the floor 708 may be located another suitable distance above the support surface 1200, at least in some embodiments. In some embodiments, the floor 708 defines, or otherwise includes, a step 1208 arranged in close proximity to the door 232. In such embodiments, the step 1208 may be arranged nineteen inches in the vertical direction 362 about the support surface 1200, although it should be appreciated that the step 1208 may be located another suitable distance above the support surface 1200, at least in some embodiments. Furthermore, in some embodiments, the floor 708 and/or the step 1208 are arranged in the vertical direction 362 above a centerline of one or more of the electric motors 1700.

The illustrative vehicle 100 includes a step 1210 arranged in close proximity to the door 232 on the right side 124 thereof. In some embodiments, the step 1210 is arranged within the operator cabin 142 when the door 232 is in a closed position (e.g., as shown in FIG. 2). In any case, the illustrative step 1210 facilitates entry into, and exit from, the operator cabin 142 from the right side 124 of the vehicle 100 in use thereof. In the illustrative embodiment, the step 1210 is arranged between the floor 708 and the support surface 1200 in the vertical direction 362. More specifically, the step 1210 is arranged eleven inches in the vertical direction 362 above the support surface 1200 and eight inches in the vertical direction 362 beneath the floor 708, although it should be appreciated that the step 1210 may be located another suitable distance above the support surface 1200 and below the floor 708, at least in some embodiments. In some embodiments, only one step (i.e., the step 1210) is provided to facilitate entry into, and exit from, the operator cabin 142 from the right side 124 of the vehicle 100.

In some embodiments, each tire 1220 coupled to one of the wheels 110 includes a wear indicator 1230. The wear indicator 1230 includes, or is otherwise embodied as, any indicator of wear, scrub, degradation, or damage that may occur in use of the tire 1220. In some embodiments, the wear indicator 1230 may include, or otherwise be embodied as, a ring 1222 extending circumferentially about the tire 1220 and projecting outwardly from a face 1224 thereof. In such embodiments, the ring 1222 may be formed from a material capable of being abraded to indicate wear or degradation. In some embodiments, the tire 1220 and/or the ring 1222 may include multiple layers of abradable material stacked upon one another to differing degrees that are circumferentially spaced from one another about the tire 1220 and capable of indicating wear at different depths into the tire 1220.

Figure 13:
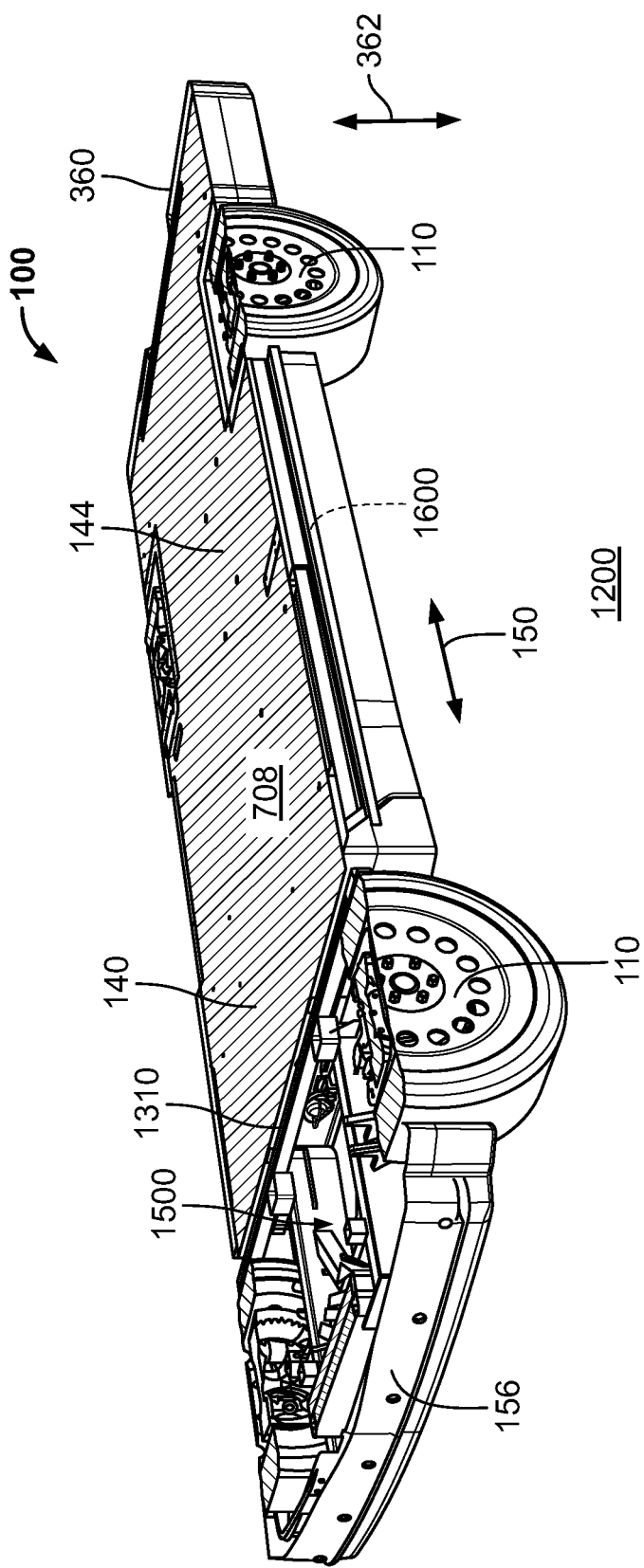
FIG. 13 is a sectional view of the electric vehicle of FIG. 1 taken about line 13-13 showing the floor arranged rearward of an impact management system included in the vehicle.

Referring now to FIG. 13, the illustrative vehicle 100 extends in the longitudinal direction 150 from the front end 156 to the rear end 360 arranged opposite the end 156. The floor 708 illustratively extends through the operator cage 140 and the rear compartment 144 from a firewall 1310 to the rear end 360. The floor 708 is flat from the firewall 1310 to the rear end 360 and arranged parallel to the support surface 1200. The impact management system 1500 illustratively extends from the front end 156 to the firewall 1310. As suggested above, the floor 708 is arranged nineteen inches above the support surface 1200 in the vertical direction 362 from the firewall 1310 to the rear end 360, at least in some embodiments.

Figure 14:
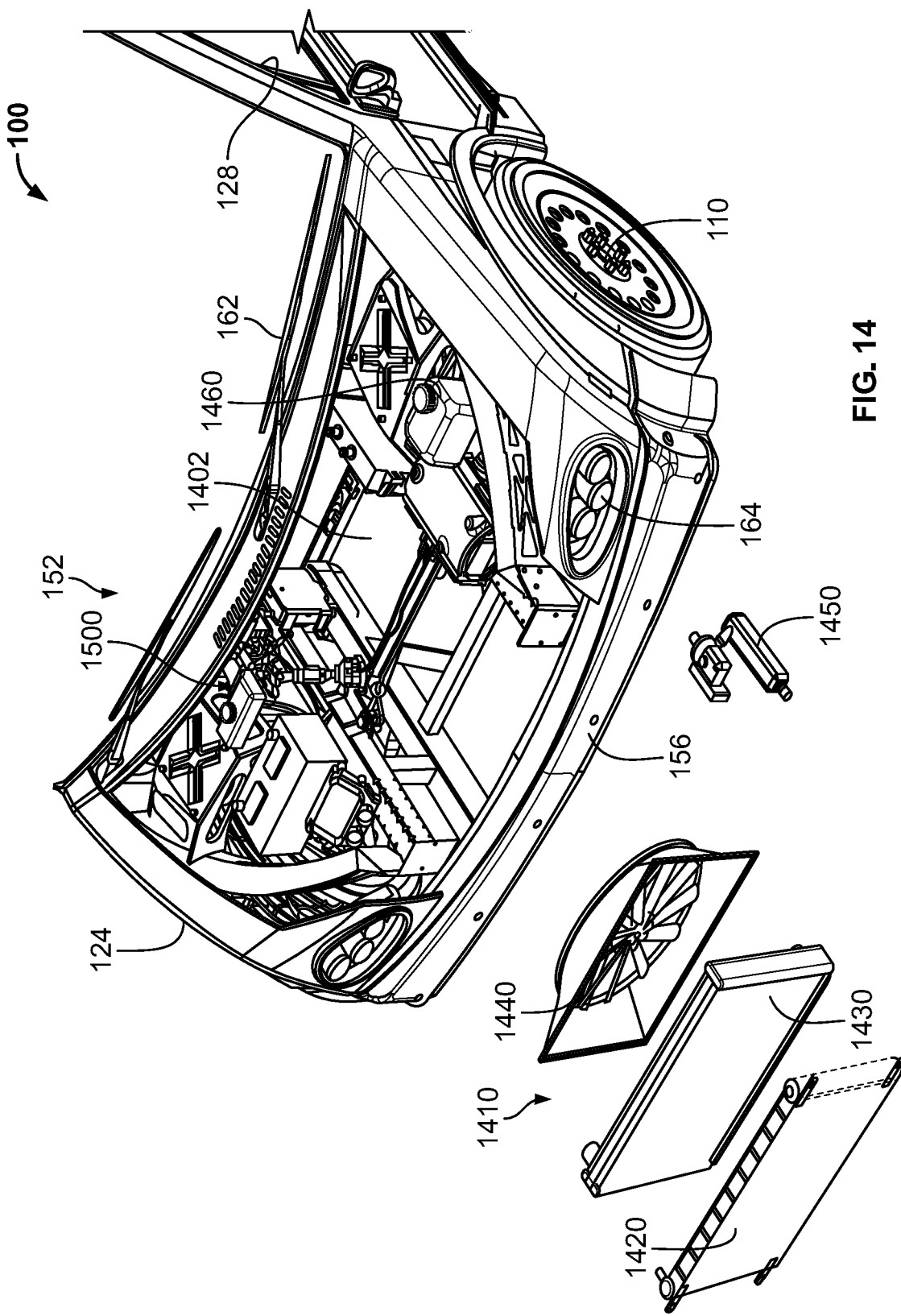
FIG. 14 is a partial exploded perspective view showing a number of components arranged in an internal cavity near the front of the electric vehicle of FIG. 1.

Referring now to FIG. 14, a number of components are arranged beneath the hood 152 with the impact management system 1500 in the internal cavity 1402. In some embodiments, those components include a climate control system 1410 capable of cooling one or more devices arranged in the internal cavity 1402. Additionally, in some embodiments, in conjunction with the control system 2500, the climate control system 1410 is capable of adjusting the temperature within the operator cabin 142 and/or the rear compartment 144. In any case, in the illustrative embodiment, the cooling system 1410 includes an air conditioner condenser 1420, a radiator 1430, a shrouded fan 1440, a variable speed pump 1450, and a coolant reservoir 1460.

Figure 15:
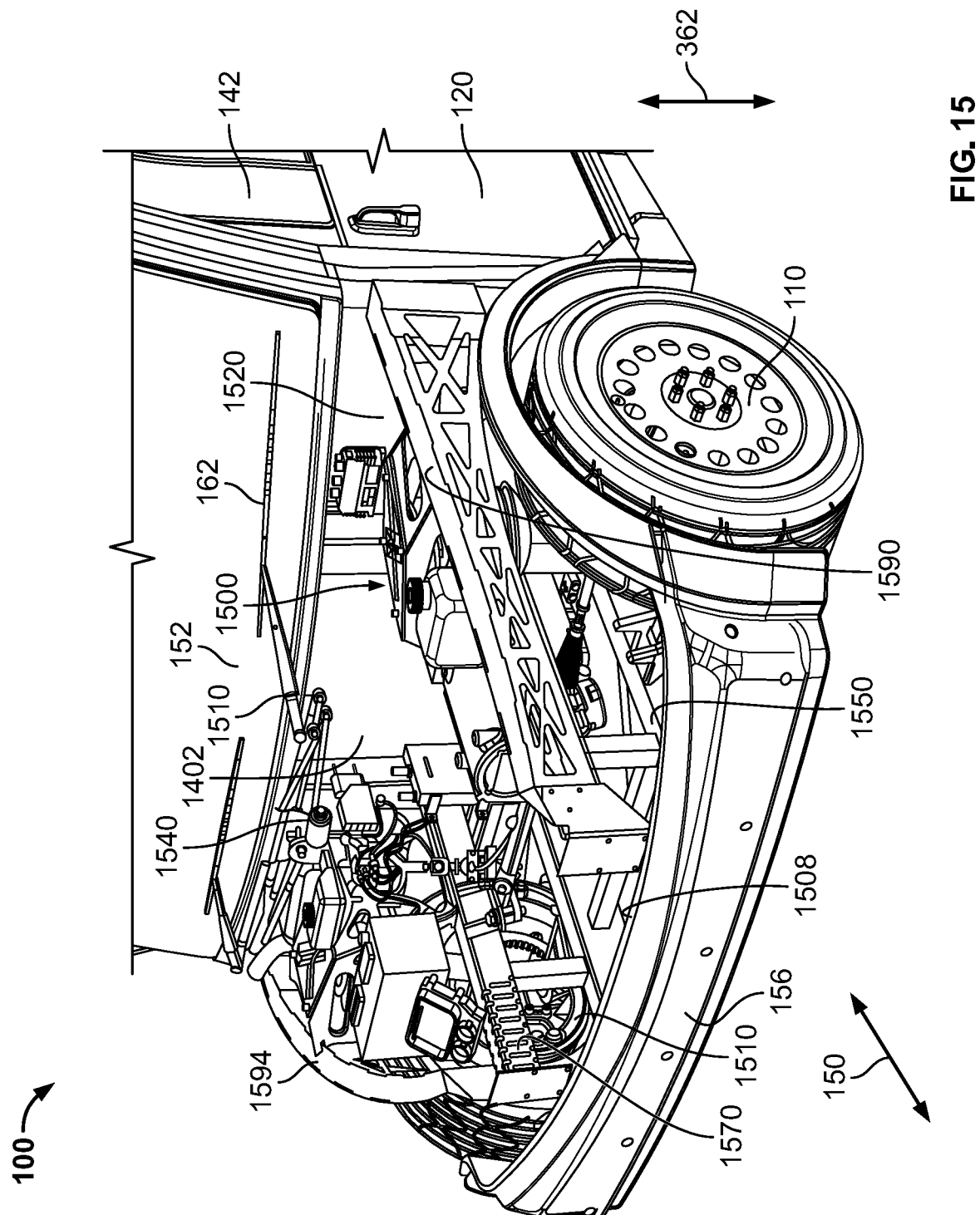
FIG. 15 is a partial front perspective view of the electric vehicle of FIG. 1 showing the impact management system arranged in the internal cavity.
Figure 16:
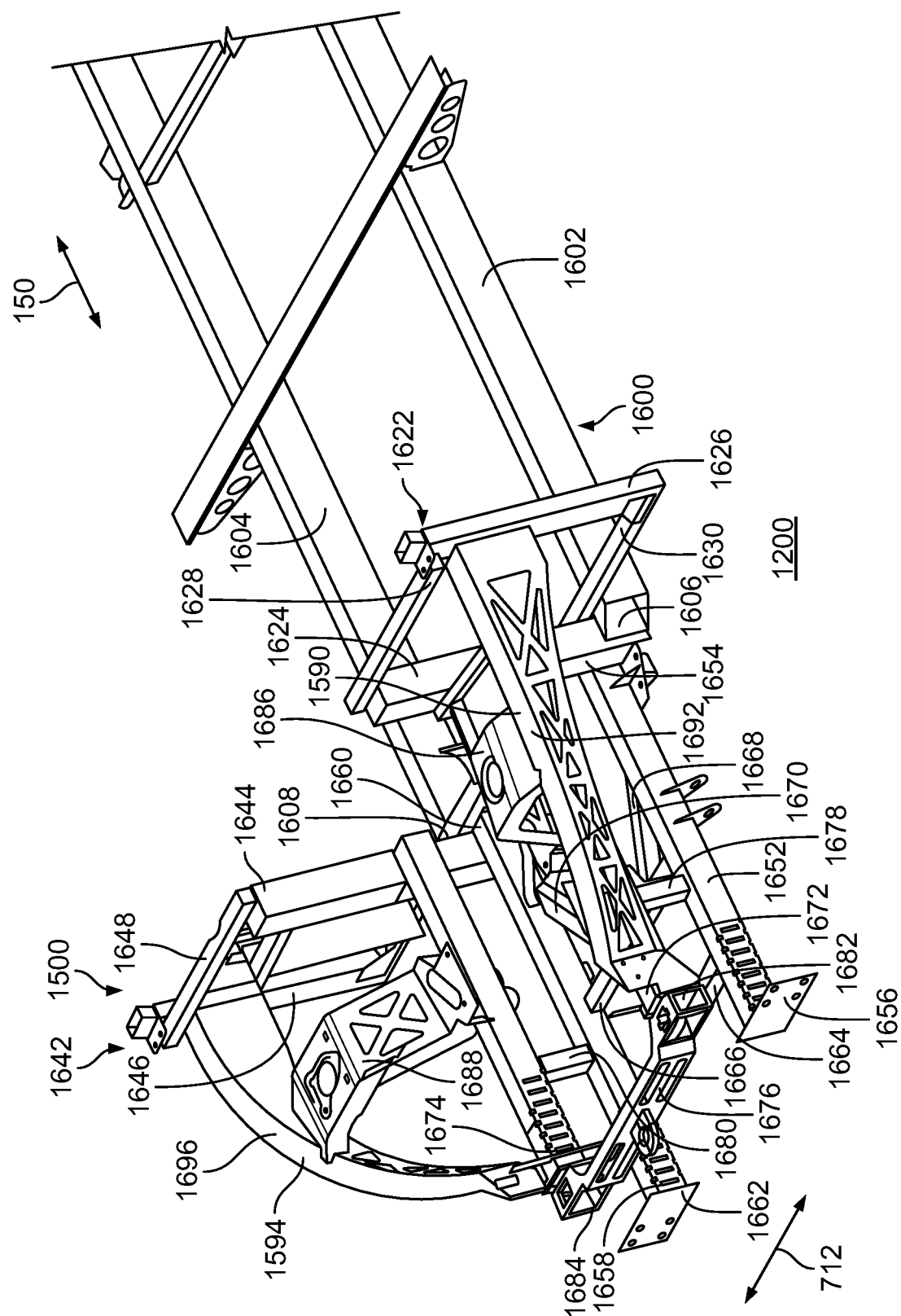
FIG. 16 is a partial front perspective view of the impact management system depicted in FIG. 15 coupled to a frame structure of the electric vehicle.

Referring now to FIG. 15, the illustrative impact management system 1500 is configured to deform in response to impact forces applied thereto in use of the vehicle 100 to maintain structural integrity of the operator cage 140 and rails 1602, 1604 of the frame structure 1600 (see FIG. 16). It should be appreciated that the illustrative impact management system 1500 is configured to dissipate energy and/or forces applied to the vehicle 100 during an impact event or crash. Of course, energy and/or forces resulting from an impact event may be applied to the vehicle 100 at various locations. In one example, such energy and/or forces may be applied to the vehicle 100 at a location proximate the front end 156 and in a direction generally parallel to the longitudinal direction 150 (e.g., during a head-on collision). In another example, such energy and/or forces may be applied to the vehicle 100 near one or more of the front wheels 110 and in a direction generally perpendicular to the longitudinal direction 150 (e.g., during a side collision). Regardless, as a consequence of the energy dissipation effected by the illustrative impact management system 1500, lower magnitude energy and/or forces may be transmitted to other components of the vehicle 100. In some cases, deformation of the illustrative impact management system 1500 is associated with, or otherwise corresponds to, minimal transmission of energy and/or forces resulting from an impact event to the operator cage 140 and the rails 1602, 1604 such that those components remain substantially intact during the impact event.

Referring now to FIGS. 15 and 16, the illustrative impact management system 1500 is shown positioned in the internal cavity 1402 of the vehicle 100 (see FIG. 15) and coupled to the frame structure 1600 with the body 120 and the wheels 110 omitted for the sake of simplicity (see FIG. 16). The impact management system 1500 includes a crash cage 1510 that extends in the longitudinal direction 150 from ends 1606, 1608 of the rails 1602, 1604 to the front end 156 of the vehicle 100. In the illustrative embodiment, the crash cage 1510 includes a post assembly 1520, a post assembly 1540, a lower crash assembly 1550, an upper crash assembly 1570, an outrigger structure 1590, and an outrigger structure 1594, among other things, as described in greater detail below. The impact management system 1500 extends in the vertical direction 362 between a lower end 1508 and an upper end 1510.

The illustrative post assembly 1520 includes, or otherwise defines, a four-bar linkage 1622 that is generally aligned with the rail 1602 in the longitudinal direction 150 at the end 1606 of the rail 1602. In the illustrative embodiment, the post assembly 1520 includes an upright inner post 1624, an upright outer post 1626, an upper link 1628, and a base link 1630. The upright inner post 1624 is directly affixed to the rail 1602 at the end 1606 thereof. The upright outer post 1626 is spaced from the upright inner post 1624 in the lateral direction 712 such that the outer post 1626 is located outwardly of the inner post 1624 in the lateral direction 712. The upper link 1628 extends in the lateral direction 712 from the inner post 1624 to the outer post 1626. The base link 1630 extends in the lateral direction 712 from the upright outer post 1626 to an upright outer post 1646 of the post assembly 1540. The base link 1630 is illustratively positioned vertically beneath the upper link 1628 relative to the support surface 1200. The upright inner post 1624, the upright outer post 1626, the upper link 1628, and the base link 1630 illustratively cooperate to at least partially define the four-bar linkage 1622.

The illustrative post assembly 1540 includes, or otherwise defines, a four-bar linkage 1642 that is aligned with the rail 1604 in the longitudinal direction 150 at the end 1608 of the rail 1604. In the illustrative embodiment, the post assembly 1540 includes an upright inner post 1644, an upright outer post 1646, an upper link 1648, and the base link 1630. The upright inner post 1644 is directly affixed to the rail 1604 at the end 1608 thereof. The upright outer post 1646 is spaced from the upright inner post 1644 in the lateral direction 712 such that the outer post 1646 is located outwardly of the inner post 1644 in the lateral direction 712. The upper link 1648 extends in the lateral direction 712 from the inner post 1644 to the outer post 1646. The base link 1630 is illustratively positioned vertically beneath the upper link 1648 relative to the support surface 1200. The upright inner post 1644, the upright outer post 1646, the upper link 1648, and the base link 1630 illustratively cooperate to at least partially define the four-bar linkage 1642.

In the illustrative embodiment, the lower crash assembly 1550 at least partially defines the lower end 1508 of the impact management system 1500. The illustrative crash assembly 1550 includes a lower beam or crash tube 1652, a lower beam or crash tube 1658, a crossbar 1664, a crossbar 1666, a strut 1668, and a strut 1670. Those components of the crash assembly 1550 are described in greater detail below.

The illustrative lower beam 1652 is directly affixed to the upright inner post 1624 of the post assembly 1520. The lower beam 1652 extends parallel to the rail 1602 in the longitudinal direction 150 and is aligned with the rail 1602 in the vertical direction 362. The lower beam 1652 extends in the longitudinal direction 150 from an end 1654 coupled to the inner post 1624 to an end 1656 arranged adjacent the front end 156 of the vehicle 100.

The illustrative lower beam 1658 is spaced from the beam 1652 in the lateral direction 712 and directly affixed to the upright inner post 1644 of the post assembly 1540. The lower beam 1658 extends parallel to the rail 1604 in the longitudinal direction 150 and is aligned with the rail 1604 in the vertical direction 362. The lower beam 1658 extends in the longitudinal direction 150 from an end 1660 coupled to the inner post 1644 to an end 1662 arranged adjacent the front end 156 of the vehicle 100.

The illustrative crossbar 1664 extends in the lateral direction 712 between the lower beams 1652, 1658 and interconnects the lower beams 1652, 1658. The illustrative crossbar 1666 also extends in the lateral direction 712 between the lower beams 1652, 1658 and interconnects the lower beams 1652, 1658. The crossbar 1666 is positioned rearward of the crossbar 1664 in the longitudinal direction 150.

The illustrative strut 1668 is affixed to the lower beam 1652 and the crossbar 1666. More specifically, the strut 1668 is affixed to the lower beam 1652 and the crossbar 1666 such that the strut 1668 is arranged oblique to the lower beam 1652. The illustrative strut 1670 is affixed to the lower beam 1658 and the crossbar 1666. More specifically, the strut 1670 is affixed to the lower beam 1658 and the crossbar 1666 such that the strut 1670 is arranged oblique to the lower beam 1658.

In the illustrative embodiment, the upper crash assembly 1570 is positioned above the lower crash assembly 1550 in the vertical direction 362. The illustrative crash assembly 1570 includes an upper beam 1672, an upper beam 1674, a crash wall 1676, a vertical support 1678, and a vertical support 1680. Those components of the crash assembly 1570 are described in greater detail below.

The illustrative upper beam 1672 is directly affixed to the upright inner post 1624 of the post assembly 1520. The upper beam 1672 extends parallel to the rail 1602 in the longitudinal direction 150 and is arranged vertically above the rail 1602 in the vertical direction 362. The upper beam 1672 is interconnected with the lower beam 1652 by the vertical support 1678. The vertical support 1678 is illustratively arranged in the longitudinal direction 150 between the crossbars 1664, 1666.

The illustrative upper beam 1674 is spaced from the beam 1672 in the lateral direction 712 and directly affixed to the upright inner post 1644 of the post assembly 1540. The upper beam 1674 extends parallel to the rail 1604 in the longitudinal direction 150 and is arranged vertically above the rail 1604 in the vertical direction 362. The upper beam 1674 is interconnected with the lower beam 1658 by the vertical support 1680. The vertical support 1680 is illustratively arranged in the longitudinal direction 150 between the crossbars 1664, 1666.

The illustrative crash wall 1676 extends in the lateral direction 712 between the upper beams 1672, 1674 to interconnect the beams 1672, 1674. In the illustrative embodiment, the crash wall 1676 is arranged in the longitudinal direction 150 adjacent the front end 156 of the vehicle 100. In some embodiments, the crash wall 1676 may be coupled to, and provide an interconnection between, the outrigger structures 1590, 1594 adjacent the front end 156 of the vehicle 100.

The illustrative outrigger structure 1590 is at least partially arranged outwardly of the lower crash assembly 1550 and the upper crash assembly 1570 in the lateral direction 712. In the illustrative embodiment, the outrigger structure 1590 extends from the upright outer post 1626 of the post assembly 1520 to an end 1682 of the crash wall 1676 that is located adjacent the upper beam 1672. The illustrative outrigger structure 1590 is shaped to define an arc 1692 between the upright outer post 1626 and the end 1682 of the crash wall 1676. At least in some embodiments, the outrigger structure 1590 is configured for deformation in response to forces applied to the vehicle 100 in a direction generally perpendicular to, and not parallel to, the longitudinal direction 150 during an impact event (e.g., a side collision).

The illustrative outrigger structure 1594 is at least partially arranged outwardly of the lower crash assembly 1550 and the upper crash assembly 1570 in the lateral direction 712. In the illustrative embodiment, the outrigger structure 1594 is arranged opposite the outrigger structure 1590 and extends from the upright outer post 1646 of the post assembly 1540 to an end 1684 of the crash wall 1676 that is located adjacent the upper beam 1674. The illustrative outrigger structure 1594 is shaped to define an arc 1696 between the upright outer post 1646 and the end 1684 of the crash wall 1676. At least in some embodiments, the outrigger structure 1594 is configured for deformation in response to forces applied to the vehicle 100 in a direction generally perpendicular to, and not parallel to, the longitudinal direction 150 during an impact event (e.g., a side collision).

In the illustrative embodiment, the crash cage 1510 of the impact management system 1500 includes a reinforcement brace 1686 that is coupled between the upper beam 1672 of the upper crash assembly 1570 and the outrigger structure 1590. More specifically, the reinforcement brace 1686 extends outwardly in the lateral direction 712 and upwardly in the vertical direction 362 from the upper beam 1672 to the outrigger structure 1590 to interconnect the upper beam 1672 and the outrigger structure 1590. At least in some embodiments, the reinforcement brace 1686 is configured for deformation in response to forces applied to the vehicle 100 in a direction generally perpendicular to, and not parallel to, the longitudinal direction 150 during an impact event (e.g., a side collision).

In the illustrative embodiment, the crash cage 1510 of the impact management system 1500 includes a reinforcement brace 1688 that is coupled between the upper beam 1674 of the upper crash assembly 1570 and the outrigger structure 1594. More specifically, the reinforcement brace 1688 extends outwardly in the lateral direction 712 and upwardly in the vertical direction 362 from the upper beam 1674 to the outrigger structure 1594 to interconnect the upper beam 1674 and the outrigger structure 1594. At least in some embodiments, the reinforcement brace 1688 is configured for deformation in response to forces applied to the vehicle 100 in a direction generally perpendicular to, and not parallel to, the longitudinal direction 150 during an impact event (e.g., a side collision).

Figure 17:
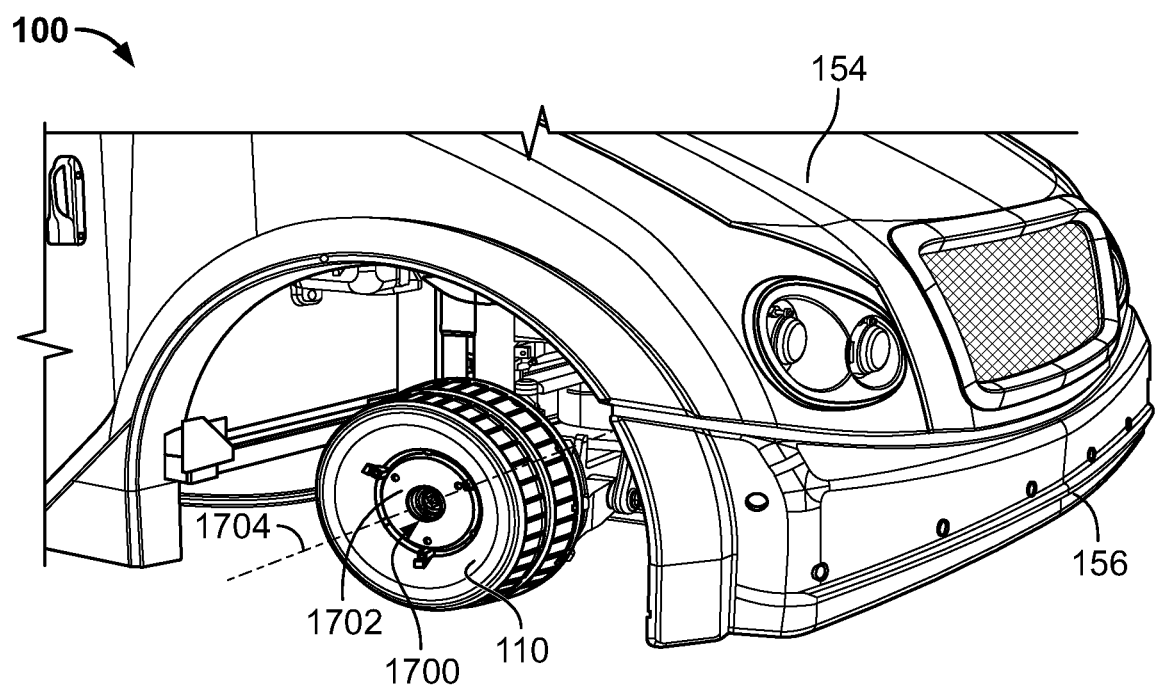
FIG. 17 is a partial perspective view of the electric vehicle of FIG. 1 showing an electric motor integrated directly into a wheel.

Referring now to FIG. 17, in the illustrative embodiment, the land vehicle 100 includes electric motors 1700 configured to produce rotational power to drive rotation of the wheels 110 in use of the vehicle 100. Each of the electric or hub motors 1700 is directly integrated into one of the wheels 110 such that the vehicle 100 includes four electric motors 1700. As shown in FIG. 17, one of the electric motors 1700 (i.e., the electric motor 1702) is directly integrated into the wheel 110.

The illustrative motor 1702 is embodied as, or otherwise includes, any device that is capable of being driven by electrical energy supplied by a power cell assembly (not shown) to produce rotational power. As indicated above, the illustrative motor 1702 is directly integrated into the wheel 110 so that rotational power produced by the motor 1702 is provided directly to the wheel 110 in use of the vehicle 100. At least in some embodiments, the motor 1702 is directly integrated into the wheel 110 such that the motor 1702 and the wheel 110 are concentrically mounted about an axis 1704. In such embodiments, the axis 1704 may define, or otherwise coincide with, a rotational axis of the wheel 110.

In some embodiments, each of the electric motors 1700 is configured to generate about 100 horsepower (hp) in use of the land vehicle 100. In some embodiments, each of the motors 1700 may be embodied as, or otherwise include, a brushed DC motor, a brushless DC motor, a switched reluctance motor, a universal AC/DC motor, an induction motor, a torque motor, a synchronous motor, a doubly-fed electric machine, an ironless or coreless rotor motor, a pancake or axial rotor motor, a servo motor, a stepper motor, a linear motor, or the like. Of course, it should be appreciated that in other embodiments, each of the motors 1700 may be embodied as, or otherwise include, another suitable device capable of converting electrical energy supplied by the power cell assembly to rotational power to drive the wheels 110. In some embodiments, each of the electric motors 1700 is configured to generate a sufficient amount of rotational power and/or motive force to drive movement of one or more of the wheels 110 over an estimated service life of the vehicle 100, which may encompass a significant number of missions and/or delivery trips. In such embodiments, each of the motors 1700 may be configured to generate less than 100 horsepower in use of the vehicle 100 or greater than 100 horsepower in use of the vehicle 100, whatever the case may be.

In the illustrative embodiment, each of the electric motors 1700 is coupled to one of the wheels 110 without any transmission gearing interposed therebetween. Even more, at least in some embodiments, the illustrative land vehicle 100 entirely omits one or more transmissions. Consequently, in such embodiments, the land vehicle 100 is free from components that may be present in conventional transmissions, such as torque converters, rotating torque-transmitting mechanisms or clutches, stationary torque-transmitting mechanisms or brakes, transmission gearing, pressure control valves, shift control valves, regulator valves, check valves, and various components of electro-hydraulic control systems. As a result, the powertrain and/or drivetrain of the vehicle 100 may include significantly fewer parts than other configurations, thereby facilitating maintenance, reliability, and reduced design complexity, among other things.

In the illustrative embodiment, the electric motors 1700 of the land vehicle 100 are the only components of the vehicle 100 capable of generating rotational power to drive the wheels 110. The illustrative land vehicle 100 therefore does not include an internal combustion engine. As such, the land vehicle 100 is free from a number of components that may be utilized in conventional configurations to transmit rotational power from one or more internal combustion engines to one or more wheels, such as driveshafts, differentials, and axles, just to name a few. In that additional respect, the powertrain and/or drivetrain of the vehicle 100 may include significantly fewer parts than other configurations, which may facilitate maintenance, reliability, and reduced design complexity as mentioned above.

Figure 18:
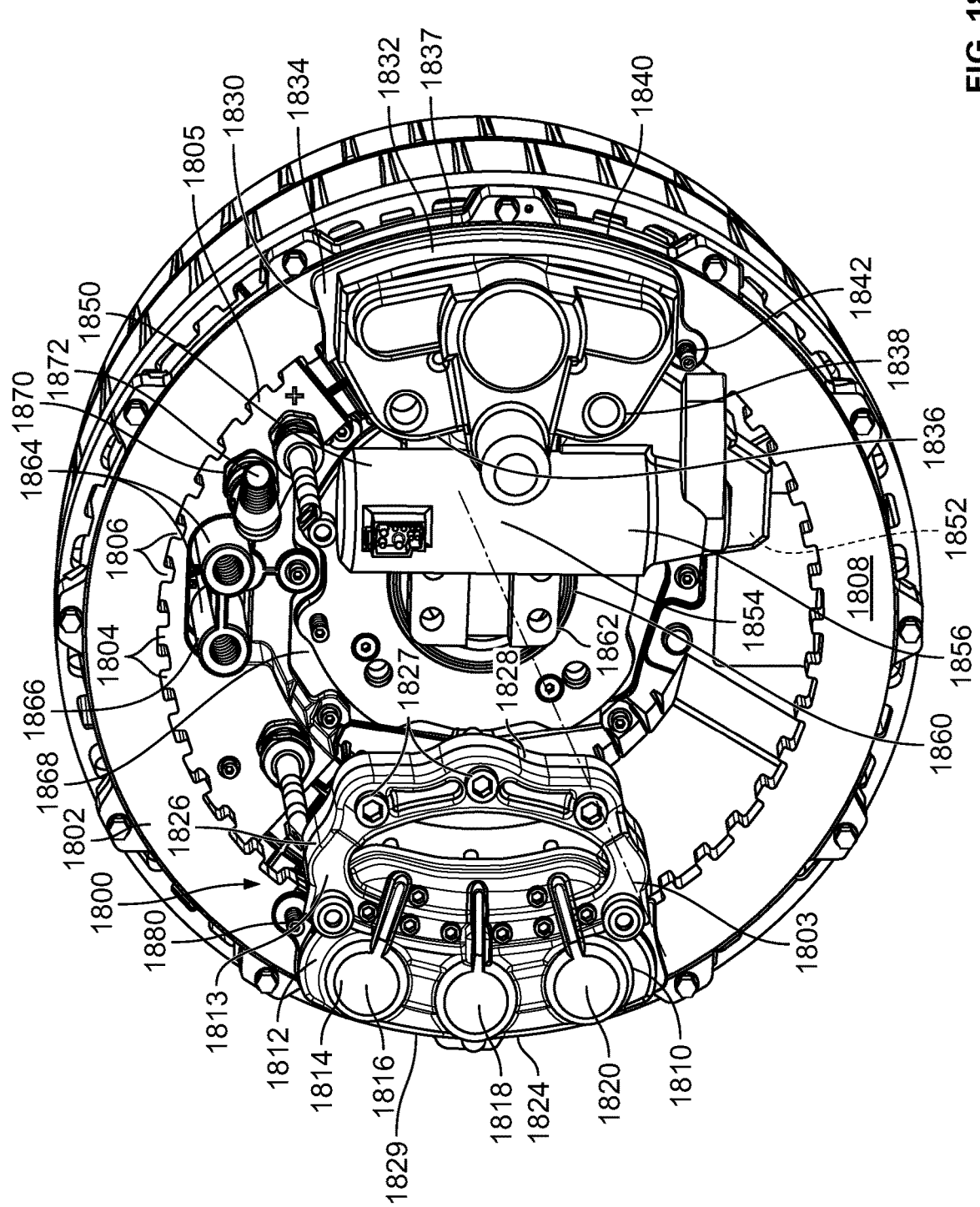
FIG. 18 is a perspective view of a brake system coupled to a wheel of the electric vehicle of FIG. 1.

Referring now to FIG. 18, in the illustrative embodiment, the land vehicle 100 includes brake systems 1800 configured to resist rotation of the wheels 110 to stop and/or slow the vehicle 100 in use thereof. One brake system 1800 is illustratively coupled to each one of the wheels 110. Each illustrative brake system 1800 includes a disc 1802, a braking device 1810, a braking device 1830, and a braking device 1850. The illustrative disc 1802 includes notches 1804 defined between circumferentially adjacent teeth 1806 of the disc 1802. The illustrative braking device 1810 is configured to contact an outer face 1808 of the disc 1802 to resist rotation of one of the wheels 110 in use of the vehicle 100. The illustrative braking device 1830 is circumferentially spaced from the braking device 1810 about the disc 1802 and configured to contact the outer face 1808 thereof to resist rotation of one of the wheels 110 in use of the vehicle 100. The illustrative braking device 1850 is configured to contact one or more teeth 1806 of the disc 1802 to resist rotation of one of the wheels 120 in use of the vehicle 100. It should be appreciated that any one of the braking devices 1810, 1830, 1850 of each brake system 1800 may be activated to resist rotation of one of the wheels 110 in use of the vehicle 100 and thereby provide redundant braking means. Additionally, it should be appreciated that the multiple braking devices 1810, 1830, 1850 may be activated in combination with one another to cooperatively resist rotation of one of the wheels 110 in use of the vehicle 100.

In the illustrative embodiment, the disc or rotor 1802 of each brake system 1800 is configured for rotation about a rotational axis 1803. The illustrative disc 1802 is coupled to the wheel 110 for common rotation therewith about the axis 1803, at least in some embodiments. Additionally, in some embodiments, the disc 1802 may be integrally formed with the wheel 110. At an inner diameter 1805 thereof, the disc 1802 is formed to include the notches 1804 that are defined between circumferentially adjacent teeth 1806 of the disc 1802.

The illustrative braking device 1810 is configured to contact the outer face 1808 of the disc 1802 to resist rotation of the wheel 110 about the axis 1803 in use of the land vehicle 100. In the illustrative embodiment, the braking device 1810 is embodied as, or otherwise includes, a disc brake assembly. The braking device 1810 includes a caliper 1812, one or more pistons 1814, and brake pads 1824. In addition, the braking device 1810 may include a number of components not depicted in the Figures, such as one or more seals, dust boots, bleeder devices, anti-rattle clips, brake shoes, linings, locating pins, mounting pins, bearings, retainers, caps, anchor plates, mounting plates, spindles, or the like.

The illustrative caliper 1812 of the braking device 1810 is embodied as, or otherwise includes, a housing 1813 of the braking device 1810 that at least partially houses a number of components of the braking device 1810, such as the piston(s) 1814, for example. In the illustrative embodiment, the braking device 1810 includes only one caliper 1812. Furthermore, in the illustrative embodiment, the braking device 1810 includes six pistons (only pistons 1816, 1818, 1820 are shown in FIG. 18) that are at least partially housed by the only one caliper 1812. However, in other embodiments, it should be appreciated that the braking device 1810 may include only one piston. The illustrative braking device 1810 also includes a pair of brake pads (only brake pad 1824 is shown) that are configured to contact opposite sides (i.e., outer and inner sides) of the disc 1802 to resist rotation of the wheel 110 about the axis 1803 in use of the vehicle 100.

The caliper 1812 of the braking device 1810 may have a variety of constructions. In the illustrative example, the caliper 1812 has a two-piece construction in which two parts (only part 1826 is shown) are secured to one another in close proximity to an end 1828 of the caliper 1812 by fasteners 1827. In the illustrative example, the two parts of the caliper 1812 are spaced apart from one another in close proximity to an end 1829 that is arranged opposite the end 1828. The brake pads are coupled to inner sides of the parts and arranged in confronting relation with one another to permit contact between the brake pads and the disc 1802 when the disc 1802 is positioned between the pads adjacent the end 1829. In the illustrative example, a sensor 1880 is coupled to the part 1826 of the caliper 1812 at an outer periphery thereof. The sensor 1880 is configured to provide a signal indicative of wear or degradation of the brake pads in use of the vehicle 100, at least in some embodiments. In other examples, however, the caliper 1812 may have another suitable construction and be formed from another suitable number of parts.

In some embodiments, the wheel 110 illustratively depicted in FIG. 18 is supported for rotation about the rotational axis 1803 by a bearing 1860. In such embodiments, a braking sensor 1862 is integrated into the bearing 1860. The illustrative braking sensor 1862 is configured to provide a signal to the control system 2500 indicative of a rotational speed of the wheel 110 in use of the vehicle 100, at least in some embodiments. The signal provided by the braking sensor 1862 may be utilized to control one or more components of an anti-lock brake system (not shown) included in the vehicle 100.

In some embodiments, fluid connections 1864 are located radially between the rotational axis 1803 and the inner diameter 1805 of the disc 1802. The fluid connections 1864 may be utilized to circulate cooling fluid delivered from a cooling fluid source (not shown) through the wheel 110 to cool the wheel 110 in use of the vehicle 100, at least in some embodiments. Each of the fluid connections 1864 may be embodied as, or otherwise include, a projection 1866 that extends outwardly away from an interior 1868 of the wheel 110 and parallel to the rotational axis 1803 such that the fluid connections 1864 are generally not recessed. In some embodiments, a connector 1870 is located in the interior 1868 of the wheel 110 adjacent the fluid connections 1864. The connector 1870 may be configured to interface with a single low voltage cable 1872 that is at least partially positioned in the interior 1868.

In the illustrative embodiment, the braking device 1830 is an electronic parking brake mechanism that may be controlled using the EPB switch 960. Additionally, in the illustrative embodiment, the braking device 1850 is a parking pawl mechanism. It should be appreciated that in use of the vehicle 100, the braking devices 1830, 1850 may be operated by the control system 2500 independently of one another and/or in concert with one another.

As mentioned above, the illustrative electronic parking brake mechanism 1830 is configured to contact the outer face 1808 of the disc 1802 to resist rotation of the wheel 110 about the axis 1803 in use of the vehicle 100. As shown in FIG. 18, the parking brake mechanism 1830 is circumferentially spaced from the braking device 1810 about the disc 1802 and the axis 1803. More specifically, the parking brake mechanism 1830 and the braking device 1810 are circumferentially spaced about 180 degrees from one another about the disc 1802 and the axis 1803. In the illustrative arrangement, among other components, the fluid connections 1864 and the connector 1870 are circumferentially located between the parking brake mechanism 1830 and the braking device 1810.

At least in some embodiments, the illustrative parking brake mechanism 1830 includes a number of features similar to corresponding features of the braking device 1810. In such embodiments, the parking brake mechanism 1830 includes a housing 1832, one or more actuators or pistons 1838 at least partially housed by the housing 1832, and brake pads (only brake 1840 is shown) supported by the housing 1832 that are configured to contact opposite sides (i.e., outer and inner sides) of the disc 1802 to resist rotation of the wheel 110 about the axis 1803 in use of the vehicle 100. In addition, the parking brake mechanism 1830 may include a number of components not depicted in the Figures, such as one or more seals, dust boots, bleeder devices, anti-rattle clips, brake shoes, linings, locating pins, mounting pins, bearings, retainers, caps, anchor plates, mounting plates, spindles, or the like.

The housing 1832 of the parking brake mechanism 1830 may have a variety of constructions. In the illustrative example, the housing 1832 has a two-piece construction in which two parts (only part 1834 is shown) are secured to one another in close proximity to an end 1836 of the housing 1832. In the illustrative example, the parts of the housing 1832 are spaced apart from one another in close proximity to an end 1837 that is arranged opposite the end 1836. The brake pads are coupled to inner sides of the parts and arranged in confronting relation with one another to permit contact between the brake pads and the disc 1802 when the disc 1802 is positioned between the pads adjacent the end 1837. In the illustrative example, a sensor 1842 is coupled to the part 1834 of the housing 1832 at an outer periphery thereof. The sensor 1842 is configured to provide a signal indicative of wear or degradation of the brake pads in use of the vehicle 100, at least in some embodiments. In other examples, however, the housing 1832 may have another suitable construction and be formed from another suitable number of parts.

As mentioned above, the illustrative parking pawl mechanism 1850 is configured to contact one or more teeth 1806 of the disc 1802 to resist rotation of the wheel 110 in use of the vehicle 100. Unlike some conventional devices, the illustrative parking pawl mechanism 1850 is not fitted to, and does not interact with, a transmission of the vehicle 100, since the vehicle 100 omits one or more transmissions as indicated above. Thus, unlike some conventional devices, the illustrative parking pawl mechanism 1850 does not lock an output shaft of a transmission to prevent rotation of the wheel 110.

In the illustrative embodiment, the parking pawl mechanism 1850 includes a pawl or pin 1852 at least partially housed by a housing 1856. The pawl 1852 may be sized to contact one or more of the teeth 1806 in use of the mechanism 1850. Additionally, in some embodiments, the parking pawl mechanism 1850 may include one or more actuators 1854 at least partially housed by the housing 1856. The one or more actuators 1854 are configured to drive movement (e.g., extension) of the pawl 1852 relative to the housing 1856 to contact one or more of the teeth 1806 and thereby resist rotation of the wheel 110, at least in some embodiments. Additionally, in such embodiments, the one or more actuators 1854 are configured to drive movement (i.e., retraction) of the pawl 1852 relative to the housing 1856 to release the pawl 1852 and thereby permit rotation of the wheel 110.

Referring now to FIGS. 19 and 20, one of the side mirrors 1900, 1902 is shown in greater detail. In the illustrative embodiment, each of the side mirrors 1900, 1902 includes an upper mirror 1910, a lower mirror 1920, a housing 1930, a mount arm 1940, a mount arm receiver 1950, a mount bracket 1960, and a camera system 2000 (see FIG. 20). Of course, it should be appreciated that in other embodiments, each of the side mirrors 1900, 1902 may include components in addition to, and/or as alternatives to, the aforementioned components.

The upper and lower mirrors 1910 and 1920 are illustratively held and secured by the housing 1930. In the illustrative arrangement, the upper mirror 1910 is positioned above the lower mirror 1920 in the vertical direction 362 relative to the support surface 1200. Although the illustrative housing 1930 is sized to accommodate the two mirrors 1910, 1920, in other embodiments, three or more mirrors may be located in, and held by, the housing 1930. The illustrative upper mirror 1910 has a flat or planar shape, at least in some embodiments. The illustrative lower mirror 1920 has a convex shape, at least in some embodiments.

The illustrative mount arm 1940 is affixed to the housing 1930 and extends upwardly therefrom in the vertical direction 362 to the mount arm receiver 1950. The mount arm 1940 includes a support rod 1942 and a pair of extension posts 1944, 1946 that are interconnected with the support rod 1942. The support rod 1942 is affixed to the housing 1930 and the extension posts 1944, 1946 are received in, and secured in, corresponding slots 1952, 1954 formed in the mount arm receiver 1950. The mount arm receiver 1950 is affixed to the mount bracket 1960, which is configured to be mounted directly to the body 120 of the vehicle 100 (e.g., as shown in FIGS. 1-4). In some embodiments, the mount arm receiver 1950 may be coupled to the mount bracket 1960 by an attachment feature such as a rib 1970, for example. In such embodiments, the rib 1970 may act as a stiffening element that provides rigidity to the side mirror 1900, 1902.

The illustrative camera system 2000 is affixed to the housing 1930 at a lower end 2032 thereof. In the illustrative embodiment, the camera system 2000 is embodied as, or otherwise includes, any device or collection of devices capable of capturing images in the form of camera input and providing the input to other component(s) (e.g., the control system 2500, the operator display 910, and/or the secondary display 962). Due to the location of the camera system 2000 on each of the side mirrors 1900, 1902, images captured by the system 2000 may permit visualization of objects located behind the operator cabin 142 (i.e., in the longitudinal direction 150) outside the vehicle 100 along the right or left sides 124, 128 thereof. In some embodiments, the camera system 2000 may capture images of objects that are viewable in the side mirror viewing area 2230 depicted in FIG. 22.

In some embodiments, the camera system 2000 may be at least partially enclosed or housed by a camera housing 2002. The camera housing 2002 may be embodied as a separate housing component that is coupled to the housing 1930, at least in some embodiments. In other embodiments, the camera housing 2002 may be integrated with, and/or incorporated into, the housing 1930.

The illustrative camera system 2000 includes a lens 2004 that is at least partially retained by the camera housing 2002. In some embodiments, a protective screen (not shown) may be employed to cover the lens 2004. Additionally, in some embodiments, the camera system 2000 may include a shutter (not shown) and at least one shutter sensor (not shown). The shutter may be configured to be actuated (e.g., opened or closed) to selectively permit light passage therethrough. The one or more shutter sensors may be configured to detect actuation of the shutter in use of the camera system 2000.

In some embodiments, a light source (not shown) may be arranged in close proximity to the camera system 2000 of each of the side mirrors 1900, 1902 to provide illumination that may facilitate image capture by the system 2000 and/or identification of objects in the images. In some embodiments, the light source may be retained by the camera housing 2002. In some embodiments, however, it should be appreciated that the light source may be omitted entirely.

Referring now to FIG. 21, an operator 2100 is shown seated in the operator cabin 142 in the operator seat 710 on the right side 704 of the cabin 142 in use of the vehicle 100. In the illustrative position, the operator 2100 may open the door 232 to access mailboxes located in close proximity to the right side 124 of the vehicle 100. Additionally and/or alternatively, when positioned as shown in FIG. 21, the operator 2100 may access mailboxes located in close proximity to the right side 124 of the vehicle 100 through a window 2450 (see FIG. 24) of the door 232. Furthermore, in the illustrative position, the operator 2100 is able to visualize one or more objects disposed near the left side 128 of the vehicle 100 through the opera window 130, the opera window mirror 132, the side mirror 1900, and the window 134 of the door 136. The viewing areas in which the operator 2100 is able to visualize the one or more objects through the aforementioned components are described below with reference to FIG. 22.

In some embodiments, when seated in the operator cabin 142 as shown in FIG. 21, the operator 2100 is able to observe a visible area 2102 through the windshield 152. The visible area 2102 (which is only partially depicted in FIG. 21) is illustratively located forward of the front end 156 of the vehicle 100 in the longitudinal direction 150. In some embodiments, the visible area 2102 may extend forward of the front end 156 of the vehicle 100 in the direction 150 by a distance of 100 inches. Due at least in part to the vertical distance (i.e., 19 inches) between the floor 708 and the support surface 1200, the operator 2100 may be positioned closer to the support surface 1200 when seated in the operator cabin 142 than might otherwise be the case, for example, in configurations in which the floor 708 is spaced farther from the support surface 1200 in the vertical direction 362. Additionally, due at least in part to the vertical distance between the floor 708 and the support surface 1200, more vertical headspace may be provided between the operator 2100 and a ceiling 2302 of the operator cabin 142 than might otherwise be the case, for example, in configurations in which the floor 708 is spaced farther from the support surface 1200 in the vertical direction 362. As a result of the illustrative positioning of the operator 2100 in the operator cabin 142, the visible area 2102 may be increased compared to other configurations, such as the configurations mentioned above.

Figures 22, 23:
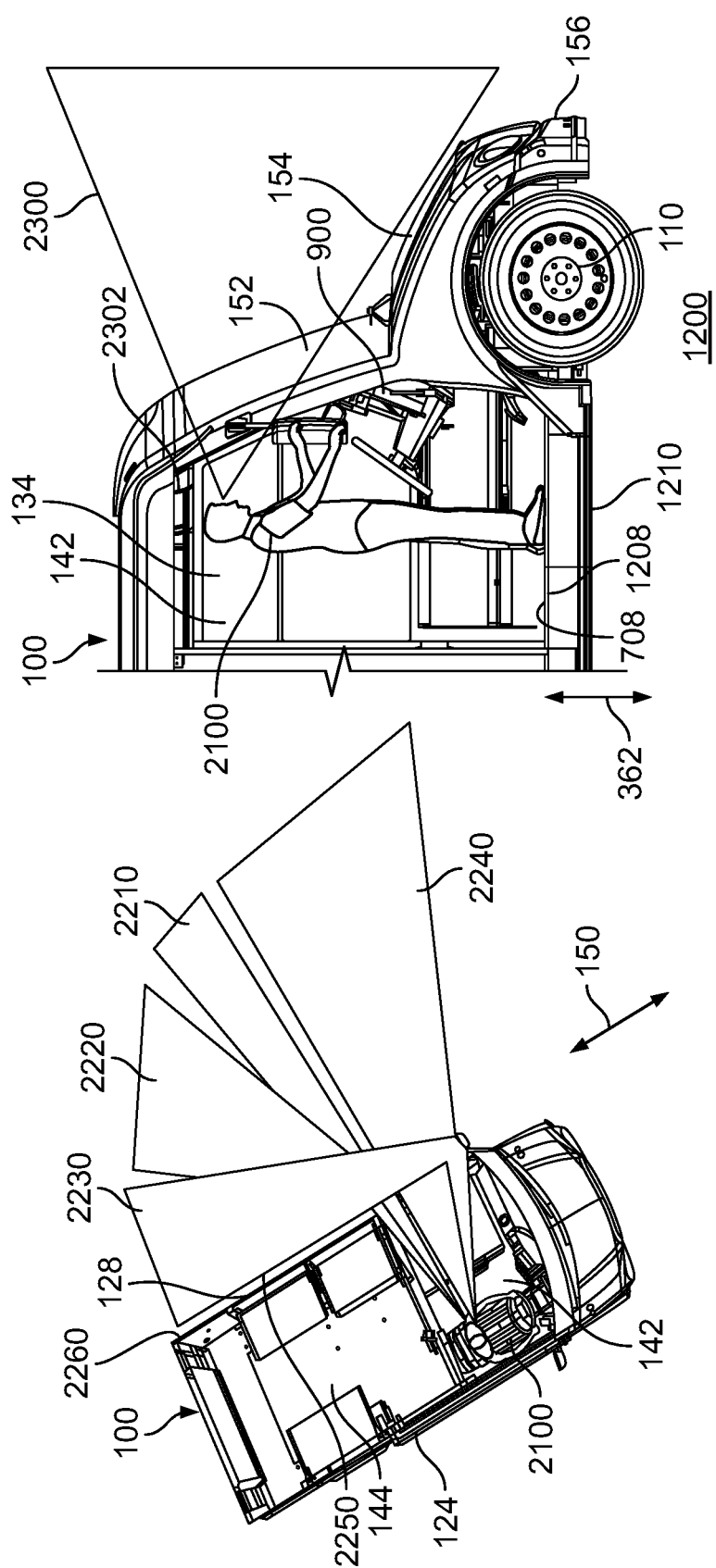
FIG. 22 is a top perspective view of the electric vehicle of FIG. 1 showing a number of viewing areas that may be visualized by an operator located in the operator cabin.
FIG. 23 is a partial side elevation view of the electric vehicle of FIG. 1 showing an operator standing in the operator cabin.

Referring now to FIG. 22, in the illustrative embodiment, the operator 2100 positioned in the operator cabin 142 (e.g., as discussed above with regard to FIG. 21) is able to visualize a number of viewing areas located outside of the left side 128 of the vehicle 100. Those viewing areas include, but are not limited to, the opera window viewing area 2210, the opera window mirror viewing area 2220, the side mirror viewing area 2230, and a side window viewing area 2240. The opera window 130 permits visualization by the operator 2100 of the opera window viewing area 2210. The opera window mirror 132 permits visualization by the operator 2100 of the opera window mirror viewing area 2220. The side mirror 1900 permits visualization by the operator 2100 of the side mirror viewing area 2230. The window 134 of the door 136 permits visualization by the operator 2100 of the side window viewing area 2240.

In the illustrative embodiment, the side window viewing area 2240 is relatively aligned with the operator cabin 142 in the longitudinal direction 150. In some embodiments, one portion of the side window viewing area 2240 extends at least slightly forward of the operator cabin 142 in the longitudinal direction 150, whereas another portion of the side window viewing area 2240 extends at least slightly rearward of the operator cabin 142 in the direction 150. As suggested by FIG. 22, at least in some embodiments, the side window viewing area 2240 generally does not extend, or extends only minimally, to an area 2250 located outside the rear compartment 144 of the vehicle 100 along the left side 128 thereof.

In the illustrative embodiment, the opera window viewing area 2210 is relatively aligned with the opera window 130 in the longitudinal direction 150. In some embodiments, one portion of the opera window viewing area 2210 extends at least slightly forward of the opera window 130 in the longitudinal direction 150, whereas another portion of the opera window viewing area 2210 extends at least slightly rearward of the opera window 130 in the direction 150. As suggested by FIG. 22, at least in some embodiments, the opera window viewing area 2210 generally does not extend, or extends only minimally, to the area 2250 located outside the rear compartment 144 of the vehicle 100 along the left side 128 thereof. Furthermore, in at least some embodiments, the opera window viewing area 2210 extends rearward of, and is generally disposed rearward of, the side window viewing area 2240 in the longitudinal direction 150.

In the illustrative embodiment, the opera window mirror viewing area 2220 extends along the area 2250 located outside the rear compartment 144 of the vehicle 100 along the left side 128 thereof. In some embodiments, the opera window mirror viewing area 2220 generally does not extend, or extends only minimally, to an area 2260 located outside the rear compartment 144 along the left side 128 of the vehicle 100 near the rear end 360 thereof. Additionally, in some embodiments, the opera window mirror viewing area 2220 extends rearward of, and is generally disposed rearward of, each of the opera window viewing area 2210 and the side window viewing area 2240 in the longitudinal direction 150.

In the illustrative embodiment, the side mirror viewing area 2230 extends along the area 2250 located outside of the rear compartment 144 of the vehicle 100 along the left side 128 thereof. In some embodiments, the side mirror viewing area 2230 provides a view of the area 2260 located outside the rear compartment 144 along the left side 128 of the vehicle 100. The illustrative side mirror viewing area 2230 extends rearward of, and is generally disposed rearward of, each of the opera window viewing area 2210 and the side window viewing area 2240. Additionally, in at least some embodiments, the side mirror viewing area 2230 extends at least partially rearward of the opera window mirror viewing area 2220 in the longitudinal direction 150.

Referring now to FIG. 23, the illustrative operator 2100 is depicted through the door 232 standing in the operator cabin 142. In the illustrative embodiment, when standing in the operator cabin 142 in close proximity to the control panel 900, the operator 2100 is able to observe a visible area 2300 through the windshield 152. The visible area 2300 is illustratively located forward of the front end 156 of the vehicle 100 in the longitudinal direction 150. Due at least in part to the vertical distance (i.e., 19 inches) between the floor 708 and the support surface 1200, the operator 2100 may be positioned closer to the support surface 1200 when standing in the operator cabin 142 than might otherwise be the case, for example, in configurations in which the floor 708 is spaced farther from the support surface 1200 in the vertical direction 362. Additionally, due at least in part to the vertical distance between the floor 708 and the support surface 1200, more vertical headspace may be provided between the operator 2100 and a ceiling 2302 of the operator cabin 142 than might otherwise be the case, for example, in configurations in which the floor 708 is spaced farther from the support surface 1200 in the vertical direction 362. As a result of the illustrative positioning of the operator 2100 in the operator cabin 142, the visible area 2300 may be increased compared to other configurations, such as the configurations mentioned above.

Figure 24:
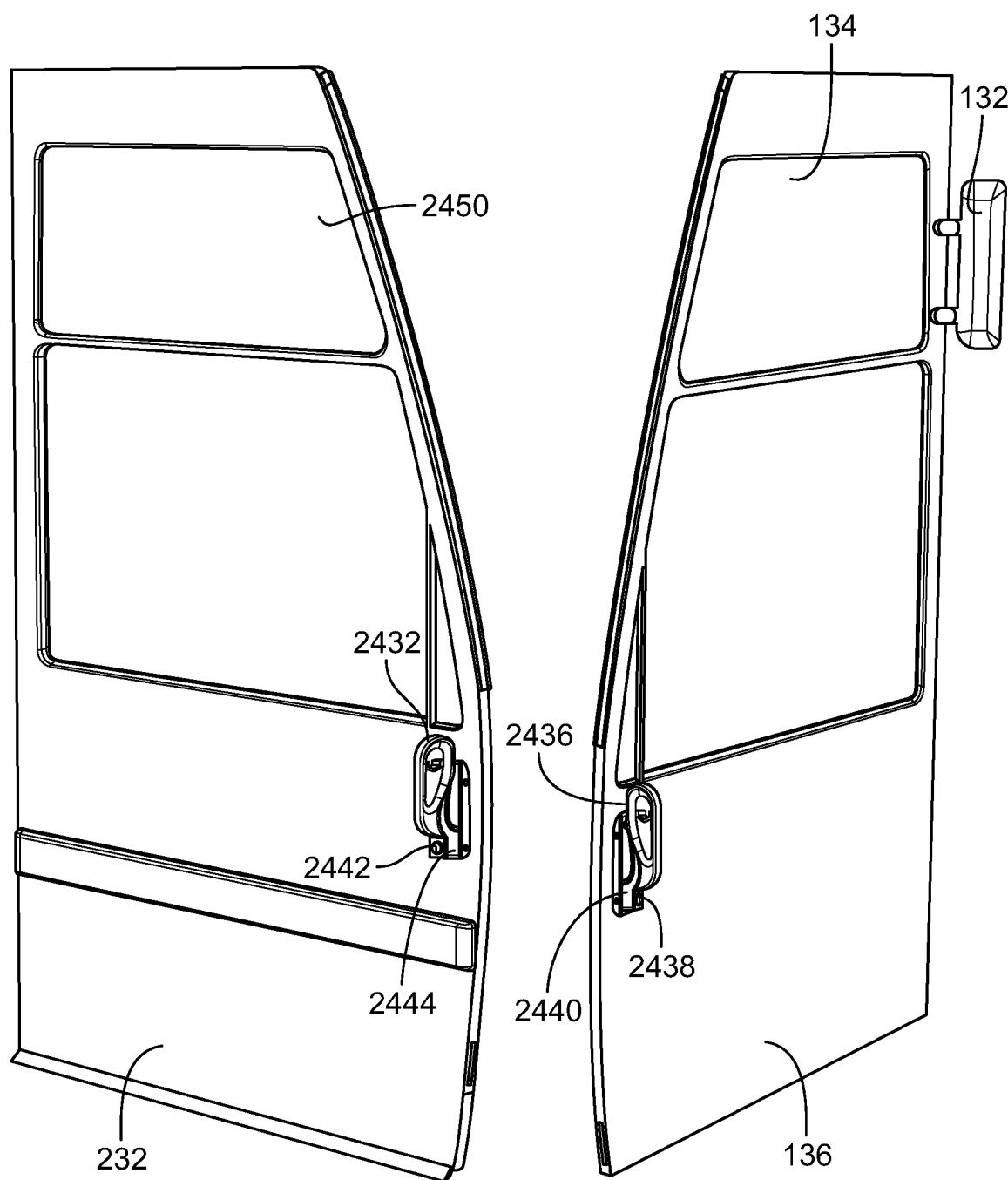
FIG. 24 is a perspective view of first and second doors included in the electric vehicle of FIG. 1 that provide access to the operator cabin from opposite sides of the vehicle.

Referring now to FIG. 24, the illustrative doors 136, 232 are positioned beside one another with other features of the vehicle 100 (e.g., the body 120, the operator cage 140, the rear compartment 144, the wheels 110, etc.) removed for the sake of simplicity. The door handle 2436 coupled to the door 136 includes the lock 2438 and the fingerprint identification feature 2440. The door handle 2432 coupled to the door 232 includes the lock 2442 and the fingerprint identification feature 2444.

In the illustrative embodiment, operation of the lock 2438 of the handle 2436 is controlled (e.g., by the control system 2500) based on input provided by the user to the fingerprint identification feature 2440. The illustrative fingerprint identification feature 2440 is embodied as, or otherwise includes, any device or collection of devices capable of receiving biometric input from the user such as fingerprint data, for example. In some embodiments, the fingerprint identification feature 2440 may include an optical scanner, a capacitance scanner, an ultrasonic scanner, a thermal scanner, or the like. Additionally, in some embodiments, the fingerprint identification feature 2440 may include, or otherwise be embodied as, a biometric credential reader, a keypad or code entry device, or another form of credential reader. It should be appreciated that when the feature 2440 includes, or is embodied as, a biometric credential reader, the feature 2440 is configured to receive a credential (e.g., a fingerprint or other biometric credential, a code, an electronic token, etc.) from a user positioned on the outside of the door 136 on the left side 128 of the vehicle 100. If the credential is valid, the user may be permitted to open the door 136.

In the illustrative embodiment, operation of the lock 2442 of the handle 2432 is controlled (e.g., by the control system 2500) based on input provided by the user to the fingerprint identification feature 2444. The illustrative fingerprint identification feature 2444 is embodied as, or otherwise includes, any device or collection of devices capable of receiving biometric input from the user such as fingerprint data, for example. In some embodiments, the fingerprint identification feature 2444 may include an optical scanner, a capacitance scanner, an ultrasonic scanner, a thermal scanner, or the like. Additionally, in some embodiments, the fingerprint identification feature 2444 may include, or otherwise be embodied as, a biometric credential reader, a keypad or code entry device, or another form of credential reader. It should be appreciated that when the feature 2444 includes, or is embodied as, a biometric credential reader, the feature 2444 is configured to receive a credential (e.g., a fingerprint or other biometric credential, a code, an electronic token, etc.) from a user positioned on the outside of the door 232 on the right side 124 of the vehicle 100. If the credential is valid, the user may be permitted to open the door 232.

In the illustrative embodiment, the identification features 2440, 2444 may be embodied as, or otherwise include, any device or collection of devices capable of receiving input from a user indicative of the identity of the user. In some embodiments, each of the identification features 2440, 2444 may be embodied as, or otherwise include, one or more of a fingerprint scanner, an RFID-based identification device compatible with, and/or accessible from, a user's phone, a retinal scanner, a facial recognition device, or any other device(s) capable of receiving biometric input from the user. Furthermore, in some embodiments, each of the identification features 2440, 2444 may be embodied as, or otherwise include, a cloud-based identification feature that minimizes, or entirely omits, physical hardware, such as phones, RFID tags or fobs, keys, or the like. It should be appreciated that identification features 2440, 2444 which minimize and/or omit physical hardware may allow a user to avoid handling the hardware while carrying other items, and that in some embodiments, the identification features 2440, 2444 may facilitate, or otherwise be associated with, hands-free or relatively hands-free operation.

In some embodiments, each of the handles 2432, 2436 may include an outwardly projecting tab or elephant ear that may facilitate hands-free or relatively hands-free operation. As such, a user carrying one or more items may contact the tab or elephant ear of the handles 2432, 2436 to open the respective doors 232, 136 without using his/her hands. Instead, the user may utilize his/her arm, shoulder, or elbow to open the doors 232, 136, at least in some embodiments. Of course, it should be appreciated that the handles 2432, 2436 may include any feature that may facilitate hands-free or relatively hands-free operation.

Figure 25:
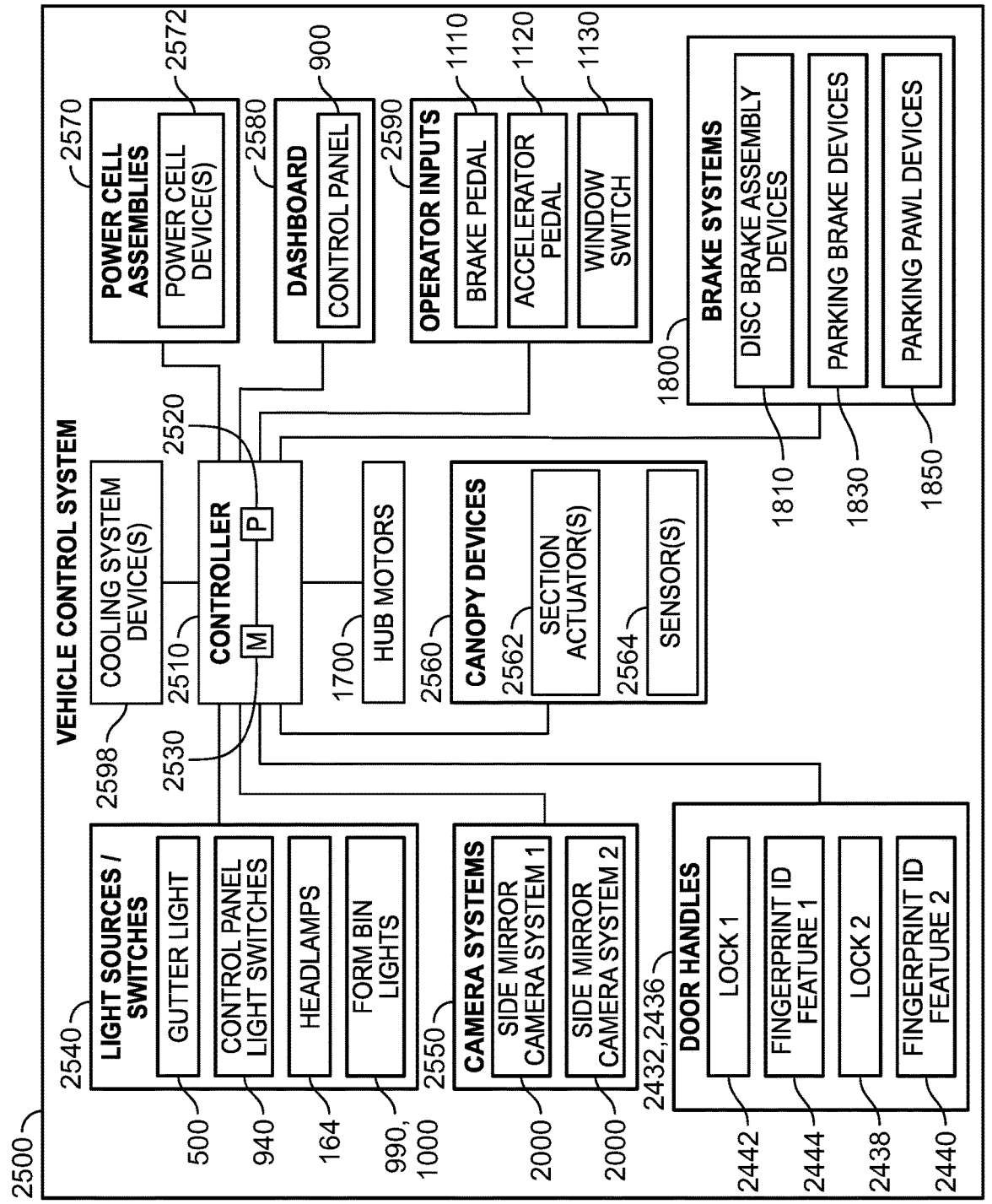
FIG. 25 is a diagrammatic view of a control system that may be included in the electric vehicle of FIG. 1.

Referring now to FIG. 25, the illustrative control system 2500 is utilized to control operation of various components and/or systems of the land vehicle 100, as indicated above. The control system 2500 illustratively includes a controller 2510 having a processor 2520 and a memory device 2530 coupled to the processor 2520. In the illustrative embodiment, the controller 2510 is communicatively coupled to (i) light sources/switches 2540, (ii) camera systems 2550, (iii) the door handles 2432, 2436, (iv) the hub motors 1700, (v) canopy devices 2560, (vi) the brake systems 1800, (vii) power cell assemblies 2570, (viii) a dashboard 2580, (ix) operator inputs 2590, and (x) cooling system device(s) 2598. Of course, it should be appreciated that the controller 2510 may be communicatively coupled to additional devices of the vehicle 100 not shown in FIG. 25, at least in some embodiments.

The processor 2520 may be embodied as, or otherwise include, any type of processor, controller, or other compute circuit capable of performing various tasks such as compute functions and/or controlling the functions of the land vehicle 100 and subcomponents or subsystems thereof. For example, the processor 2520 may be embodied as a single or multi-core processor(s), a microcontroller, or other processor or processing/controlling circuit. In some embodiments, the processor 2520 may be embodied as, include, or be coupled to an FPGA, an application specific integrated circuit (ASIC), reconfigurable hardware or hardware circuitry, or other specialized hardware to facilitate performance of the functions described herein. Additionally, in some embodiments, the processor 2520 may be embodied as, or otherwise include, a high-power processor, an accelerator co-processor, or a storage controller. In some embodiments still, the processor 2520 may include more than one processor, controller, or compute circuit.

The memory device 2530 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 2530 may be embodied as a block addressable memory, such as those based on NAND or NOR technologies. The memory device 2530 may also include future generation nonvolatile devices, such as a three dimensional crosspoint memory device (e.g., Intel 3D XPoint™ memory), or other byte addressable write-in-place nonvolatile memory devices. In some embodiments, the memory device 2530 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The illustrative light sources/switches 2540 include, or are otherwise embodied as, any sources of light of the vehicle 100 and/or any switches used to operate the light sources of the vehicle 100. In the illustrative embodiment, the sources/switches 2540 include the gutter light 500, the light switches 940 of the control panel 900, the headlamps 164, and the lights associated with the form bins 990, 1000. Although not expressly depicted in FIG. 25, it should be appreciated that, in at least some embodiments, each of the devices 500, 940, 164, and 990, 1000 may be communicatively coupled to the controller 2510. Additionally, it should be appreciated that the sources/switches 2540 may include additional devices, at least in some embodiments.

The illustrative camera systems 2550 include, or are otherwise embodied as, any camera systems of the vehicle 100. In the illustrative embodiment, the camera systems 2550 include the camera system 2000 of the side mirror 1900 and the camera system 2000 of the side mirror 1902. Although not expressly depicted in FIG. 25, it should be appreciated that, at least in some embodiments, each camera system 2000 may be communicatively coupled to the controller 2510. Additionally, it should be appreciated that the camera systems 2550 may include additional devices, at least in some embodiments.

The illustrative door handle 2432 includes the lock 2442 and the fingerprint identification feature 2444, as discussed above. As mentioned above, the illustrative door handle 2436 includes the lock 2438 and the fingerprint identification feature 2440. Although not expressly depicted in FIG.

25, it should be appreciated that, in at least some embodiments, each of the devices 2442, 2444, 2438, 2440 may be communicatively coupled to the controller 2510. Additionally, it should be appreciated that the camera systems 2550 may include additional devices, at least in some embodiments.

The illustrative hub motors 1700 include a hub motor (e.g., hub motor 1702) integrated into each one of the wheels 110 of the vehicle 100, as indicated above. In the illustrative embodiment, although not expressly depicted in FIG. 25, it should be appreciated that each of the hub motors 1700 is communicatively coupled to the controller 2510. Therefore, the illustrative vehicle 100 includes four hub motors 1700 communicatively coupled to the controller 2510.

The illustrative canopy devices 2560 include, or are otherwise embodied as, any devices of the canopy 600 that are configured to drive movement thereof (e.g., of one of the sections 602, 604 relative to the other of the sections 602, 604) and/or to sense one or more operational characteristics thereof. In the illustrative embodiment, the canopy devices 2560 include section actuator(s) 2562 and sensor(s) 2564. The section actuator(s) 2562 may each include, or otherwise be embodied as, an electrically-powered actuator configured to drive movement of the canopy 600 in response to electrical input provided by the controller 2510. The sensor(s) 2564 may each include, or otherwise be embodied as, any device capable of sensing an operational state and/or characteristic of the canopy 600, such as an open state (in which overhead access to the storage recess 610 is permitted) or a closed state (in which overhead access to the storage recess 610 is restricted). Although not expressly depicted in FIG. 25, it should be appreciated that, in at least some embodiments, each of the devices 2562, 2564 may be communicatively coupled to the controller 2510. Additionally, it should be appreciated that the canopy devices 2560 may include additional devices, at least in some embodiments.

The illustrative brake systems 1800 include disc brake assembly devices 1810, parking brake devices 1830, and parking pawl devices 1850, one of each being included in the brake system 1800 coupled to each wheel 110 of the vehicle 100, as discussed above. Although not expressly depicted in FIG. 25, it should be appreciated that, in at least some embodiments, each of the devices 1810, 1830, 1850 may be communicatively coupled to the controller 2510. Additionally, it should be appreciated that the brake systems 1800 may include additional devices, at least in some embodiments.

In the illustrative embodiment, the controller 2520 is communicatively coupled to one or more power cell devices 2572 of a power cell assembly 2570. The power cell assembly 2570 is capable of supplying electrical power to the hub motors 1700 to drive operation thereof, at least in some embodiments. The power cell devices 2572 are illustratively embodied as, or otherwise include, any devices of the power cell assembly 2570 that are capable of providing electrical signals to the controller 2510 and/or receiving electrical signals from the controller 2510 to facilitate operation and control of the power cell assembly 2570. In some embodiments, the power cell devices 2572 include one or more sensors, switches, actuators, and/or solenoids, among other things. Of course, it should be appreciated that in other embodiments, the power cell devices 2572 may include other suitable components.

In the illustrative embodiment, the controller 2520 is communicatively coupled to the dashboard 2580 as indicated above. In some embodiments, the dashboard 2580 may include a collection of devices that cooperatively provide one or more displays and/or user interfaces communicatively coupled to one another. In one example, the dashboard 2580 includes, or is otherwise embodied as, the control panel 900. In that example, although not expressly depicted in FIG. 25, it should be appreciated that each of the devices 910, 920, 930, 940, 950, 960, 962, 964, 970, 980 may be communicatively coupled to the controller 2510. Additionally, it should be appreciated that the dashboard 2580 may include additional devices, at least in some embodiments.

In the illustrative embodiment, the operator inputs 2590 include the brake pedal 1110, the accelerator pedal 1120, and the window switch 1130. Although not expressly depicted in FIG. 25, it should be appreciated that, in at least some embodiments, each of the devices 1110, 1120, 1130 may be communicatively coupled to the controller 2510. Additionally, it should be appreciated that the operator inputs 2590 may include additional devices, at least in some embodiments. For example, in some embodiments, the operator inputs 2590 may include, or otherwise be embodied as, one or more inputs provided by the control panel 900.

In the illustrative embodiment, the cooling system device(s) 2598 include, or are otherwise embodied as, any device or collection of devices of the cooling system 1410 capable of providing electrical input to the controller 2510 and/or receiving electrical input therefrom. Although not expressly depicted in FIG. 25, it should be appreciated that, in at least some embodiments, each of the devices 1420, 1430, 1440, 1450, 1460 of the cooling system 1410 may be communicatively coupled to the controller 2510. Additionally, it should be appreciated that the cooling system device(s) 2598 may include additional devices, at least in some embodiments.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A land vehicle comprising:
a frame structure including an operator cage that at least partially defines an operator cabin and a rear compartment positioned rearward of the operator cage in a longitudinal direction;
a plurality of wheels supported by the frame structure;
a body supported by the frame structure that includes a first sidewall arranged on one side of the vehicle and second sidewall arranged on another side of the vehicle opposite the first sidewall, and
a brake system coupled to each one of the plurality of wheels,
wherein:
the first sidewall includes a first door to provide access to the operator cabin from the one side of the vehicle,
the second sidewall includes a second door to provide access to the operator cabin from the another side of the vehicle that is aligned with the first door in the longitudinal direction,
the second sidewall includes an opera window located rearward of the second door in the longitudinal direction to permit visualization of an opera window viewing area located outside of the vehicle proximate the another side thereof by an operator positioned in the operator cabin adjacent the one side of the vehicle in use of the vehicle, and each brake system includes a disc having a plurality of notches defined between circumferentially adjacent teeth of the disc, a first braking device configured to contact an outer face of the disc to resist rotation of one of the plurality of wheels, a second braking device circumferentially spaced from the first braking device about the disc that is configured to contact the outer face of the disc to resist rotation of the one of the plurality of wheels, and a third braking device configured to contact one or more teeth of the disc to resist rotation of the one of the plurality of wheels.

2. The land vehicle of claim 1, wherein the operator cabin comprises:
a steering wheel;
an operator seat; and
a rack arranged in the operator cabin opposite the steering wheel and the operator seat that includes a plurality of trays.

3. The land vehicle of claim 2, wherein:
the operator cabin comprises a pair of tracks affixed to a floor of the operator cabin and spaced apart from one another in the longitudinal direction;
the rack is movable along the pair of tracks in a lateral direction perpendicular to the longitudinal direction between a stowed position, in which the rack is disposed distant from the operator seat, and a delivery position, in which the rack is disposed close to the operator seat; and
the land vehicle has a gross vehicular weight rating (GVWR) of between 10,001 pounds and 14,000 pounds.

4. The land vehicle of claim 1, further comprising an opera window mirror mounted to the second sidewall in close proximity to the opera window to permit visualization of an opera window mirror viewing area located outside of the vehicle proximate the another side thereof by an operator positioned in the operator cabin adjacent the one side of the vehicle in use of the vehicle,
wherein the opera window mirror viewing area extends at least partially rearward of the opera window viewing area in the longitudinal direction.

5. The land vehicle of claim 4, further comprising a side mirror mounted between the second door and a front windshield of the vehicle to permit visualization of a side mirror viewing area located outside of the vehicle proximate the another side thereof by an operator positioned in the operator cabin adjacent the one side of the vehicle in use of the vehicle,
wherein the side mirror viewing area extends at least partially rearward of the opera window mirror viewing area in the longitudinal direction.

6. The land vehicle of claim 5, further comprising a camera system affixed to the side mirror.

7. The land vehicle of claim 1, further comprising a plurality of electric motors to generate rotational power that are supported by the plurality of wheels, wherein one of the plurality of electric motors is integrated directly into each one of the plurality of wheels.

8. The land vehicle of claim 1, further comprising an impact management system supported by the frame structure and positioned forward of the operator cage in the longitudinal direction,
wherein the frame structure includes a pair of rails that each extends in the longitudinal direction from a first end arranged adjacent a pair of front wheels of the vehicle to a second end arranged adjacent a pair of rear wheels of the vehicle,
wherein the impact management system is configured to deform in response to impact forces applied thereto in use of the land vehicle to maintain structural integrity of the operator cage and the pair of rails, and
wherein the impact management system includes a crash cage extending in the longitudinal direction from the first ends of the pair of rails to a forward-most point of the land vehicle.

9. The land vehicle of claim 1, further comprising:
a first door handle mounted to the first door that includes a first lock and a first identification feature configured to receive biometric data provided by an operator, wherein operation of the first lock is controlled based on the biometric data received by the first identification feature;
a second door handle mounted to the second door that includes a second lock and a second identification feature configured to receive biometric data provided by an operator, wherein operation of the second lock is controlled based on the biometric data received by the second identification feature.

10. A land vehicle comprising:
a frame structure including an operator cage that at least partially defines an operator cabin and a rear compartment positioned rearward of the operator cage in a longitudinal direction;
a plurality of wheels supported by the frame structure;
a body supported by the frame structure that includes a first sidewall arranged on one side of the vehicle having a first door to provide access to the operator cabin from the one side of the vehicle and a second sidewall arranged on another side of the vehicle opposite the first sidewall;
a cap roof coupled to each of the first and second sidewalls that covers the operator cage and the rear compartment; and
a canopy coupled to the cap roof that includes a first canopy section and a second canopy section spaced from the first canopy section in the longitudinal direction,
wherein:
a gutter extends in the longitudinal direction above the first door to define an overhang above the first door,
the gutter is integrally formed with the cap roof, and
one of the first canopy section and the second canopy section is movable relative to the cap roof and the other of the first canopy section and the second canopy section in the longitudinal direction between an open position, in which access to a storage recess is permitted, and a closed position, in which access to the storage recess is restricted.

11. The land vehicle of claim 10, further comprising a gutter light arranged in close proximity to the gutter to illuminate an area located outside of the vehicle adjacent the first door in use of the vehicle.

12. The land vehicle of claim 10, wherein the cap roof has a single-piece construction.

13. The land vehicle of claim 10, wherein the canopy is at least partially movable relative to the cap roof to selectively permit overhead airborne delivery of one or more items into the storage recess.

14. A land vehicle comprising:
a frame structure including an operator cage that at least partially defines an operator cabin and a rear compartment positioned rearward of the operator cage in a longitudinal direction;
a plurality of wheels supported by the frame structure;

a body supported by the frame structure that includes a first sidewall arranged on one side of the vehicle and a second sidewall arranged on another side of the vehicle opposite the first sidewall;
a cap roof coupled to each of the first and second sidewalls that covers the operator cage and the rear compartment; and
a canopy coupled to the cap roof that includes a first canopy section and a second canopy section spaced from the first canopy section in the longitudinal direction, wherein:

the first sidewall includes a first door to provide access to the operator cabin from the one side of the vehicle, the second sidewall includes a second door to provide access to the operator cabin from the another side of the vehicle that is aligned with the first door in the longitudinal direction, the second sidewall includes an opera window located rearward of the second door in the longitudinal direction to permit visualization of an opera window viewing area located outside of the vehicle proximate the another side thereof by an operator positioned in the operator cabin adjacent the one side of the vehicle in use of the vehicle, a gutter extends in the longitudinal direction above the first door to define an overhang above the first door, the gutter is integrally formed with the cap roof, and one of the first canopy section and the second canopy section is movable relative to the cap roof and the other of the first canopy section and the second canopy section in the longitudinal direction between an open position, in which access to a storage recess is permitted, and a closed position, in which access to the storage recess is restricted.

15. The land vehicle of claim 14, wherein the operator cabin comprises a control panel having a plurality of modular units each configured for individual removal and/or replacement without requiring removal and/or replacement of any of the other modular units.

16. The land vehicle of claim 14, wherein the operator cabin comprises a floor that is arranged nineteen inches in a vertical direction above a support surface on which the land vehicle is positioned.

17. The land vehicle of claim 16, further comprising a step arranged on the right side of the vehicle to facilitate entry into, and exit from, the operator cabin from the right side of the vehicle, wherein the step is positioned in a vertical direction between the floor and the support surface, and wherein the step is arranged eleven inches in the vertical direction above the support surface.

18. The land vehicle of claim 14, wherein the land vehicle has a gross vehicular weight rating (GVWR) of between 10,001 pounds and 14,000 pounds.

19. A land vehicle comprising:
a frame structure including an operator cage that at least partially defines an operator cabin and a rear compartment positioned rearward of the operator cage in a longitudinal direction;
a plurality of wheels supported by the frame structure; and
a body supported by the frame structure that includes a first sidewall arranged on one side of the vehicle and a second sidewall arranged on another side of the vehicle opposite the first sidewall, wherein:

the first sidewall includes a first door to provide access to the operator cabin from the one side of the vehicle, the second sidewall includes a second door to provide access to the operator cabin from the another side of the vehicle that is aligned with the first door in the longitudinal direction, the second sidewall includes an opera window located rearward of the second door in the longitudinal direction to permit visualization of an opera window viewing area located outside of the vehicle proximate the another side thereof by an operator positioned in the operator cabin adjacent the one side of the vehicle in use of the vehicle, the operator cabin includes a steering wheel, an operator seat, a rack arranged in the operator cabin opposite the steering wheel and the operator seat that includes a plurality of trays, and a pair of tracks affixed to a floor of the operator cabin and spaced apart from one another in the longitudinal direction, the rack is movable along the pair of tracks in a lateral direction perpendicular to the longitudinal direction between a stowed position, in which the rack is disposed distant from the operator seat, and a delivery position, in which the rack is disposed close to the operator seat, and the land vehicle has a gross vehicular weight rating (GVWR) of between 10,001 pounds and 14,000 pounds.

20. The land vehicle of claim 19, further comprising an opera window mirror mounted to the second sidewall in close proximity to the opera window to permit visualization of an opera window mirror viewing area located outside of the vehicle proximate the another side thereof by an operator positioned in the operator cabin adjacent the one side of the vehicle in use of the vehicle, wherein the opera window mirror viewing area extends at least partially rearward of the opera window viewing area in the longitudinal direction.

21. The land vehicle of claim 20, further comprising (i) a side mirror mounted between the second door and a front windshield of the vehicle to permit visualization of a side mirror viewing area located outside of the vehicle proximate the another side thereof by an operator positioned in the operator cabin adjacent the one side of the vehicle in use of the vehicle and (ii) a camera system affixed to the side mirror, wherein the side mirror viewing area extends at least partially rearward of the opera window mirror viewing area in the longitudinal direction.

22. The land vehicle of claim 19, further comprising:
a plurality of electric motors to generate rotational power that are supported by the plurality of wheels, wherein one of the plurality of electric motors is integrated directly into each one of the plurality of wheels; and
a brake system coupled to each one of the plurality of wheels, wherein each brake system includes a disc having a plurality of notches defined between circumferentially adjacent teeth of the disc, a first braking device configured to contact an outer face of the disc to resist rotation of one of the plurality of wheels, a second braking device circumferentially spaced from the first braking device about the disc that is configured to contact the outer face of the disc to resist rotation of the one of the plurality of wheels, and a third braking device configured to contact one or more teeth of the disc to resist rotation of the one of the plurality of wheels.

23. The land vehicle of claim 22, further comprising an impact management system supported by the frame structure and positioned forward of the operator cage in the longitudinal direction, wherein the frame structure includes a pair of rails that each extends in the longitudinal direction from a first end arranged adjacent a pair of front wheels of the vehicle to a second end arranged adjacent a pair of rear wheels of the vehicle, wherein the impact management system is configured to deform in response to impact forces applied thereto in use of the land vehicle to maintain structural integrity of the operator cage and the pair of rails, and wherein the impact management system includes a crash cage extending in the longitudinal direction from the first ends of the pair of rails to a forward-most point of the land vehicle.

24. The land vehicle of claim 19, further comprising a cap roof coupled to each of the first and second sidewalls that covers the operator cage and the rear compartment and a gutter light arranged in close proximity to a gutter to illuminate an area located outside of the vehicle adjacent the first door in use of the vehicle, wherein:

the gutter extends in the longitudinal direction above the first door to define an overhang above the first door; and the gutter is integrally formed with the cap roof.

25. The land vehicle of claim 24, wherein the cap roof has a single-piece construction.

26. The land vehicle of claim 24, further comprising a canopy coupled to the cap roof that includes a first canopy section and a second canopy section spaced from the first canopy section in the longitudinal direction, wherein one of the first canopy section and the second canopy section is movable relative to the cap roof and the other of the first canopy section and the second canopy section in the longitudinal direction between an open position, in which access to a storage recess is permitted, and a closed position, in which access to the storage recess is restricted.

27. The land vehicle of claim 26, wherein the canopy is at least partially movable relative to the cap roof to selectively permit overhead airborne delivery of one or more items into the storage recess.

* * * * *